US011962997B2

(12) United States Patent
Robinson et al.

(10) Patent No.: US 11,962,997 B2
(45) **Date of Patent: *Apr. 16, 2024**

(54) SYSTEM AND METHOD FOR ADAPTIVE AUDIO SIGNAL GENERATION, CODING AND RENDERING

(71) Applicant: Dolby Laboratories Licensing Corporation, San Francisco, CA (US)

(72) Inventors: Charles Q. Robinson, Piedmont, CA (US); Nicolas R. Tsingos, San Francisco, CA (US); Christophe Chabanne, Carpentras (FR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,440

(22) Filed: Aug. 8, 2022

(65) Prior Publication Data

US 2023/0045090 A1 Feb. 9, 2023

Related U.S. Application Data

(63) Continuation of application No. 17/156,459, filed on Jan. 22, 2021, now Pat. No. 11,412,342, which is a (Continued)

(51) Int. Cl.
*H04S 7/00* (2006.01)
*G10L 19/008* (2013.01)
(Continued)

(52) U.S. Cl.
CPC ............ *H04S 7/308* (2013.01); *G10L 19/008* (2013.01); *G10L 19/20* (2013.01); *H04R 5/02* (2013.01);
(Continued)

(58) Field of Classification Search
None
See application file for complete search history.

(56) References Cited

U.S. PATENT DOCUMENTS 5,155,510 A 10/1992 Beard
5,602,923 A 2/1997 Ozaki
(Continued)

FOREIGN PATENT DOCUMENTS

CN 101001485 7/2007
CN 101133454 2/2008
(Continued)

OTHER PUBLICATIONS

Arumi, P. et. al., "Remastering of Movie Soundtracks into Immersive 3D Audio", Amsterdam Blender Conference, slides 1-25, Oct. 24, 2009.
(Continued)

*Primary Examiner* — Paul W Huber

(57) ABSTRACT

Embodiments are described for an adaptive audio system that processes audio data comprising a number of independent monophonic audio streams. One or more of the streams has associated with it metadata that specifies whether the stream is a channel-based or object-based stream. Channel-based streams have rendering information encoded by means of channel name; and the object-based streams have location information encoded through location expressions encoded in the associated metadata. A codec packages the independent audio streams into a single serial bitstream that contains all of the audio data. This configuration allows for the sound to be rendered according to an allocentric frame of reference, in which the rendering location of a sound is based on the characteristics of the playback environment (e.g., room size, shape, etc.) to correspond to the mixer's intent. The object position metadata contains the appropriate allocentric frame of reference information required to play
(Continued)

the sound correctly using the available speaker positions in a room that is set up to play the adaptive audio content.

9 Claims, 9 Drawing Sheets

Related U.S. Application Data continuation of application No. 16/679,945, filed on Nov. 11, 2019, now Pat. No. 10,904,692, which is a continuation of application No. 16/443,268, filed on Jun. 17, 2019, now Pat. No. 10,477,339, which is a continuation of application No. 16/207,006, filed on Nov. 30, 2018, now Pat. No. 10,327,092, which is a continuation of application No. 16/035,262, filed on Jul. 13, 2018, now Pat. No. 10,165,387, which is a continuation of application No. 15/905,536, filed on Feb. 26, 2018, now Pat. No. 10,057,708, which is a continuation of application No. 15/672,656, filed on Aug. 9, 2017, now Pat. No. 9,942,688, which is a continuation of application No. 15/483,806, filed on Apr. 10, 2017, now Pat. No. 9,800,991, which is a continuation of application No. 15/263,279, filed on Sep. 12, 2016, now Pat. No. 9,622,009, which is a continuation of application No. 14/866,350, filed on Sep. 25, 2015, now Pat. No. 9,467,791, which is a continuation of application No. 14/130,386, filed as application No. PCT/US2012/044388 on Jun. 27, 2012, now Pat. No. 9,179,236.

(60) Provisional application No. 61/636,429, filed on Apr. 20, 2012, provisional application No. 61/504,005, filed on Jul. 1, 2011.

(51) Int. Cl.

| | |
|---|---|
| ***G10L 19/20*** | (2013.01) |
| ***H04R 5/02*** | (2006.01) |
| ***H04R 5/04*** | (2006.01) |
| ***H04R 27/00*** | (2006.01) |
| ***H04S 3/00*** | (2006.01) |
| ***H04S 5/00*** | (2006.01) |

(52) U.S. Cl.

CPC ............... *H04R 5/04* (2013.01); *H04R 27/00* (2013.01); *H04S 3/008* (2013.01); *H04S 5/005* (2013.01); *H04S 7/30* (2013.01); *H04S 7/305* (2013.01); *H04S 5/00* (2013.01); *H04S 7/302* (2013.01); *H04S 2400/01* (2013.01); *H04S 2400/03* (2013.01); *H04S 2400/11* (2013.01); *H04S 2420/01* (2013.01); *H04S 2420/03* (2013.01); *H04S 2420/11* (2013.01); *H04S 2420/13* (2013.01)

(56) References Cited

U.S. PATENT DOCUMENTS

| | | | |
|---|---|---|---|
| 5,642,423 | A | 6/1997 | Embree |
| 5,970,152 | A | 10/1999 | Klayman |
| 6,164,018 | A | 12/2000 | Runge |
| 6,229,899 | B1 | 5/2001 | Norris |
| 6,624,873 | B1 | 9/2003 | Callahan |
| 6,646,800 | B2 | 11/2003 | Choi |
| 6,931,370 | B1 | 8/2005 | McDowell |
| 7,106,411 | B2 | 9/2006 | Read |
| 7,212,872 | B1 | 5/2007 | Smith et al. |
| 7,333,154 | B2 | 2/2008 | Dean |
| 7,782,439 | B2 | 8/2010 | Bogdanowicz |
| 7,788,395 | B2 | 8/2010 | Bowra |
| 7,796,190 | B2 | 9/2010 | Basso |
| 7,911,580 | B2 | 3/2011 | Read |
| 8,798,776 | B2 | 8/2014 | Schildbach |
| 8,914,137 | B2 | 12/2014 | Crockett |
| 10,085,104 | B2 | 9/2018 | Ertel |
| 2001/0055398 | A1 | 12/2001 | Pachet |
| 2003/0223603 | A1 | 12/2003 | Beckman |
| 2005/0075882 | A1 | 4/2005 | Fay |
| 2005/0222841 | A1 | 10/2005 | McDowell |
| 2006/0206221 | A1 | 9/2006 | Metcalf |
| 2006/0256985 | A1 | 11/2006 | Vincent |
| 2007/0025559 | A1 | 2/2007 | Mihelich |
| 2007/0101249 | A1 | 5/2007 | Lee |
| 2007/0276656 | A1 | 11/2007 | Solbach |
| 2008/0019534 | A1 | 1/2008 | Reichelt et al. |
| 2008/0126461 | A1 | 5/2008 | Christoph |
| 2009/0220107 | A1 | 9/2009 | Every |
| 2010/0023544 | A1 | 1/2010 | Shahraray |
| 2010/0050225 | A1 | 2/2010 | Bennett |
| 2010/0135510 | A1 | 6/2010 | Yoo |
| 2010/0198378 | A1 | 8/2010 | Smithers |
| 2011/0004897 | A1 | 1/2011 | Alexander |
| 2011/0013790 | A1 | 1/2011 | Hilpert |
| 2011/0040395 | A1 | 2/2011 | Kraemer |
| 2011/0040396 | A1 | 2/2011 | Kraemer |
| 2011/0040397 | A1 | 2/2011 | Kraemer |
| 2011/0072086 | A1 | 3/2011 | Newsome |
| 2011/0088076 | A1 | 4/2011 | Li |
| 2013/0163794 | A1 | 6/2013 | Groves |

FOREIGN PATENT DOCUMENTS

| | | | |
|---|---|---|---|
| EP | 1584217 | | 10/2005 |
| EP | 1600035 | | 11/2005 |
| EP | 1695338 | | 8/2006 |
| EP | 1843635 | | 10/2007 |
| JP | 0951600 | | 2/1997 |
| JP | 2003531555 | | 10/2003 |
| JP | 2003348700 | A | 12/2003 |
| JP | 2006507727 | | 3/2006 |
| JP | 2006304165 | | 11/2006 |
| JP | 2008532374 | | 8/2008 |
| JP | 2008537833 | | 9/2008 |
| JP | 2009501463 | | 1/2009 |
| JP | 2009278381 | A | 11/2009 |
| JP | 2010505328 | A | 2/2010 |
| JP | 2010507114 | | 3/2010 |
| JP | 2010511912 | | 4/2010 |
| JP | 2010521013 | | 6/2010 |
| JP | 2010154548 | A | 7/2010 |
| JP | 2010525378 | | 7/2010 |
| JP | 2010529500 | | 8/2010 |
| JP | 2017215592 | | 12/2017 |
| JP | 6486995 | B2 | 3/2019 |
| KR | 1020100116223 | A | 10/2010 |
| RS | 1332 | | 8/2013 |
| RU | 2347282 | | 2/2009 |
| RU | 2376654 | C2 | 12/2009 |
| RU | 2008148961 | | 6/2010 |
| TW | 200921644 | A | 5/2009 |
| TW | 201033938 | | 9/2010 |
| WO | 2009115299 | | 9/2009 |
| WO | 2010006719 | | 1/2010 |
| WO | 2010058518 | A1 | 5/2010 |
| WO | 2011045813 | | 4/2011 |
| WO | 2011061174 | | 5/2011 |
| WO | 2011068490 | | 6/2011 |

OTHER PUBLICATIONS

Baelen, W. et. al., "Auro-3D A New Dimension in Cinema Sound", pp. 1-11, May 26, 2011.

Brandenburg, K. et. al., "Wave Field Synthesis: New Possibilities for Large-Scale Immersive Sound Reinforcement", Fraunhofer IDMT & Ilmenau Tech University, Mo5 E. 1, pp. I-507-I-508, Apr. 2004.

Delancie P., "Dolby DP564", <http://mixonline.com/mag/audio_dolby_dp_2/index.html>, Sep. 1, 2002.

(56) References Cited

OTHER PUBLICATIONS

Kim, S. et. al., "A Novel Test-Bed for Immersive and Interactive Broadcasting Production Using Augmented Reality and Haptics", vol. E89-D., No. 1, pp. 106-110, Jan. 2006.
Kyriakakis, C., "Fundamental and Technological Limitations of Immersive Audio Systems", Proceedings of the IEEE 1998, vol. 86, No. 5, pp. 941-951, May 1998.
Neukom, Martin "Decoding Second Order Ambisonics to 5.1 Surround Systems" AES Convention, 121, Signal Processing, Oct. 1, 2006.
Stanojevic, T. "Some Technical Possibilities of Using the Total Surround Sound Concept in the Motion Picture Technology", 133rd SMPTE Technical Conference and Equipment Exhibit, Los Angeles Convention Center, Los Angeles, California, Oct. 26-29, 1991.
Stanojevic, T. et al "Designing of TSS Halls" 13th International Congress on Acoustics, Yugoslavia, 1989.
Stanojevic, T. et al "The Total Surround Sound (TSS) Processor" SMPTE Journal, Nov. 1994.
Stanojevic, T. et al "The Total Surround Sound System", 86th AES Convention, Hamburg, Mar. 7-10, 1989.
Stanojevic, T. et al "TSS System and Live Performance Sound" 88th AES Convention, Montreux, Mar. 13-16, 1990.
Stanojevic, T. et al. "TSS Processor" 135th SMPTE Technical Conference, Oct. 29-Nov. 2, 1993, Los Angeles Convention Center, Los Angeles, California, Society of Motion Picture and Television Engineers. cited by applicant.
Stanojevic, Tomislav "3-D Sound in Future HDTV Projection Systems" presented at the 132nd SMPTE Technical Conference, Jacob K. Javits Convention Center, New York City, Oct. 13-17, 1990. cited by applicant.
Stanojevic, Tomislav "Surround Sound for a New Generation of Theaters, Sound and Video Contractor" Dec. 20, 1995. cited by applicant.
Stanojevic, Tomislav, "Virtual Sound Sources in the Total Surround Sound System" Proc. 137th SMPTE Technical Conference and World Media Expo, Sep. 6-9, 1995, New Orleans Convention Center, New Orleans, Louisiana. cited by applicant.
Theile, G., "Wave Field Synthesis—A Promising Spatial Audio Rendering Concept", Proc. of 7th Int. Conference on Digital Audio Effects, pp. 125-132, Oct. 5-8, 2004.
Van Beek, P. et al., "Metadata-Driven Multimedia Access", IEEE Signal Processing Magazine, pp. 40-52, Mar. 2003.

500

| METADATA TYPE | METADATA ELEMENTS |
|---|---|
| PROGRAM METADATA | Frame Rate |
| | Track Count |
| | Extensible Channel Description |
| | Mix Stage Description |
| AUDIO METADATA | Sample Rate |
| | Bit Depth |
| | Coding Systems |
| RENDERING METADATA | Channel Position |
| | Channel Rendering Control |
| | Object Position |
| | Object Rendering Control |

SYSTEM AND METHOD FOR ADAPTIVE AUDIO SIGNAL GENERATION, CODING AND RENDERING

CROSS-REFERENCE TO RELATED APPLICATIONS

This application is a continuation of U.S. patent application Ser. No. 17/156,459, filed on Jan. 22, 2021, which is a continuation of U.S. patent application Ser. No. 16/679,945, filed on Nov. 11, 2019 (now U.S. Pat. No. 10,904,692), which is a continuation of U.S. patent application Ser. No. 16/443,268, filed on Jun. 17, 2019 (now U.S. Pat. No. 10,477,339), which is a continuation of U.S. patent application Ser. No. 16/207,006, filed on Nov. 30, 2018, (now U.S. Pat. No. 10,327,092), which is a continuation of U.S. patent application Ser. No. 16/035,262, filed on Jul. 13, 2018 (now U.S. Pat. No. 10,165,387), which is a continuation to U.S. patent application Ser. No. 15/905,536, filed on Feb. 26, 2018 (now U.S. Pat. No. 10,057,708), which is a continuation of U.S. patent application Ser. No. 15/672,656 filed on Aug. 9, 2017 (and now U.S. Pat. No. 9,942,688), which is a continuation of U.S. patent application Ser. No. 15/483,806, filed on Apr. 10, 2017 (and now U.S. Pat. No. 9,800,991), which is a continuation of U.S. patent application Ser. No. 15/263,279, filed on Sep. 12, 2016 (and now U.S. Pat. No. 9,622,009), which is a continuation of U.S. patent application Ser. No. 14/866,350 filed on Sep. 25, 2015 (and now U.S. Pat. No. 9,467,791), which is a continuation of U.S. patent application Ser. No. 14/130,386, filed on Dec. 31, 2013 (and now U.S. Pat. No. 9,179,236), which is the United States national stage of International Patent Application No. PCT/US2012/044388 filed Jun. 27, 2012, and further claims benefit of priority to U.S. Provisional Patent Application Ser. No. 61/636,429 filed on Apr. 20, 2012 and U.S. Patent Provisional Application Ser. No. 61/504,005 filed on Jul. 1, 2011, all of which are hereby incorporated by reference in their entirety.

TECHNICAL FIELD

One or more implementations relate generally to audio signal processing, and more specifically to hybrid object and channel-based audio processing for use in cinema, home, and other environments.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Ever since the introduction of sound with film, there has been a steady evolution of technology used to capture the creator's artistic intent for the motion picture sound track and to accurately reproduce it in a cinema environment. A fundamental role of cinema sound is to support the story being shown on screen. Typical cinema sound tracks comprise many different sound elements corresponding to elements and images on the screen, dialog, noises, and sound effects that emanate from different on-screen elements and combine with background music and ambient effects to create the overall audience experience. The artistic intent of the creators and producers represents their desire to have these sounds reproduced in a way that corresponds as closely as possible to what is shown on screen with respect to sound source position, intensity, movement and other similar parameters.

Current cinema authoring, distribution and playback suffer from limitations that constrain the creation of truly immersive and lifelike audio. Traditional channel-based audio systems send audio content in the form of speaker feeds to individual speakers in a playback environment, such as stereo and 5.1 systems. The introduction of digital cinema has created new standards for sound on film, such as the incorporation of up to 16 channels of audio to allow for greater creativity for content creators, and a more enveloping and realistic auditory experience for audiences. The introduction of 7.1 surround systems has provided a new format that increases the number of surround channels by splitting the existing left and right surround channels into four zones, thus increasing the scope for sound designers and mixers to control positioning of audio elements in the theatre.

To further improve the listener experience, playback of sound in virtual three-dimensional environments has become an area of increased research and development. The spatial presentation of sound utilizes audio objects, which are audio signals with associated parametric source descriptions of apparent source position (e.g., 3D coordinates), apparent source width, and other parameters. Object-based audio is increasingly being used for many current multimedia applications, such as digital movies, video games, simulators, and 3D video.

Expanding beyond traditional speaker feeds and channel-based audio as a means for distributing spatial audio is critical, and there has been considerable interest in a model-based audio description which holds the promise of allowing the listener/exhibitor the freedom to select a playback configuration that suits their individual needs or budget, with the audio rendered specifically for their chosen configuration. At a high level, there are four main spatial audio description formats at present: speaker feed in which the audio is described as signals intended for speakers at nominal speaker positions; microphone feed in which the audio is described as signals captured by virtual or actual microphones in a predefined array; model-based description in which the audio is described in terms of a sequence of audio events at described positions; and binaural in which the audio is described by the signals that arrive at the listeners ears. These four description formats are often associated with the one or more rendering technologies that convert the audio signals to speaker feeds. Current rendering technologies include panning, in which the audio stream is converted to speaker feeds using a set of panning laws and known or assumed speaker positions (typically rendered prior to distribution); Ambisonics, in which the microphone signals are converted to feeds for a scalable array of speakers (typically rendered after distribution); WFS (wave field synthesis) in which sound events are converted to the appropriate speaker signals to synthesize the sound field (typically rendered after distribution); and binaural, in which the L/R (left/right) binaural signals are delivered to the L/R ear, typically using headphones, but also by using speakers and crosstalk cancellation (rendered before or after distribution). Of these formats, the speaker-feed format is the most common because it is simple and effective. The best sonic results (most accurate, most reliable) are achieved by mixing/monitoring and distributing to the speaker feeds directly since there is no processing between the content creator and listener. If the playback system is known in advance, a speaker feed description generally provides the highest fidelity. However, in many practical applications, the playback system is not known. The model-based description is considered the most adaptable because it makes no assumptions about the rendering technology and is therefore most easily applied to any rendering technology. Though the model-based description efficiently captures spatial information it becomes very inefficient as the number of audio sources increases.

For many years, cinema systems have featured discrete screen channels in the form of left, center, right and occasionally 'inner left' and 'inner right' channels. These discrete sources generally have sufficient frequency response and power handling to allow sounds to be accurately placed in different areas of the screen, and to permit timbre matching as sounds are moved or panned between locations. Recent developments in improving the listener experience attempt to accurately reproduce the location of the sounds relative to the listener. In a 5.1 setup, the surround 'zones' comprise of an array of speakers, all of which carry the same audio information within each left surround or right surround zone. Such arrays may be effective with 'ambient' or diffuse surround effects, however, in everyday life many sound effects originate from randomly placed point sources. For example, in a restaurant, ambient music may be played from apparently all around, while subtle but discrete sounds originate from specific points: a person chatting from one point, the clatter of a knife on a plate from another. Being able to place such sounds discretely around the auditorium can add a heightened sense of reality without being noticeably obvious. Overhead sounds are also an important component of surround definition. In the real world, sounds originate from all directions, and not always from a single horizontal plane. An added sense of realism can be achieved if sound can be heard from overhead, in other words from the 'upper hemisphere.' Present systems, however, do not offer truly accurate reproduction of sound for different audio types in a variety of different playback environments. A great deal of processing, knowledge, and configuration of actual playback environments is required using existing systems to attempt accurate representation of location specific sounds, thus rendering current systems impractical for most applications.

What is needed is a system that supports multiple screen channels, resulting in increased definition and improved audio-visual coherence for on-screen sounds or dialog, and the ability to precisely position sources anywhere in the surround zones to improve the audio-visual transition from screen to room. For example, if a character on screen looks inside the room towards a sound source, the sound engineer ("mixer") should have the ability to precisely position the sound so that it matches the character's line of sight and the effect will be consistent throughout the audience. In a traditional 5.1 or 7.1 surround sound mix, however, the effect is highly dependent on the seating position of the listener, which is disadvantageous for most large-scale listening environments. Increased surround resolution creates new opportunities to use sound in a room-centric way as opposed to the traditional approach, where content is created assuming a single listener at the "sweet spot."

Aside from the spatial issues, current multi-channel state of the art systems suffer with regard to timbre. For example, the timbral quality of some sounds, such as steam hissing out of a broken pipe, can suffer from being reproduced by an array of speakers. The ability to direct specific sounds to a single speaker gives the mixer the opportunity to eliminate the artifacts of array reproduction and deliver a more realistic experience to the audience. Traditionally, surround speakers do not support the same full range of audio frequency and level that the large screen channels support. Historically, this has created issues for mixers, reducing their ability to freely move full-range sounds from screen to room. As a result, theatre owners have not felt compelled to upgrade their surround channel configuration, preventing the widespread adoption of higher quality installations.

BRIEF SUMMARY OF EMBODIMENTS

Systems and methods are described for a cinema sound format and processing system that includes a new speaker layout (channel configuration) and an associated spatial description format. An adaptive audio system and format is defined that supports multiple rendering technologies. Audio streams are transmitted along with metadata that describes the "mixer's intent" including desired position of the audio stream. The position can be expressed as a named channel (from within the predefined channel configuration) or as three-dimensional position information. This channels plus objects format combines optimum channel-based and model-based audio scene description methods. Audio data for the adaptive audio system comprises a number of independent monophonic audio streams. Each stream has associated with it metadata that specifies whether the stream is a channel-based or object-based stream. Channel-based streams have rendering information encoded by means of channel name; and the object-based streams have location information encoded through mathematical expressions encoded in further associated metadata. The original independent audio streams are packaged as a single serial bitstream that contains all of the audio data. This configuration allows for the sound to be rendered according to an allocentric frame of reference, in which the rendering location of a sound is based on the characteristics of the playback environment (e.g., room size, shape, etc.) to correspond to the mixer's intent. The object position metadata contains the appropriate allocentric frame of reference information required to play the sound correctly using the available speaker positions in a room that is set up to play the adaptive audio content. This enables sound to be optimally mixed for a particular playback environment that may be different from the mix environment experienced by the sound engineer.

The adaptive audio system improves the audio quality in different rooms through such benefits as improved room equalization and surround bass management, so that the speakers (whether on-screen or off-screen) can be freely addressed by the mixer without having to think about timbral matching. The adaptive audio system adds the flexibility and power of dynamic audio objects into traditional channel-based workflows. These audio objects allow creators to control discrete sound elements irrespective of any specific playback speaker configurations, including overhead speakers. The system also introduces new efficiencies to the postproduction process, allowing sound engineers to efficiently capture all of their intent and then in real-time monitor, or automatically generate, surround-sound 7.1 and 5.1 versions.

The adaptive audio system simplifies distribution by encapsulating the audio essence and artistic intent in a single track file within a digital cinema processor, which can be faithfully played back in a broad range of theatre configurations. The system provides optimal reproduction of artistic intent when mix and render use the same channel configuration and a single inventory with downward adaption to rendering configuration, i.e., downmixing.

These and other advantages are provided through embodiments that are directed to a cinema sound platform, address current system limitations and deliver an audio experience beyond presently available systems.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
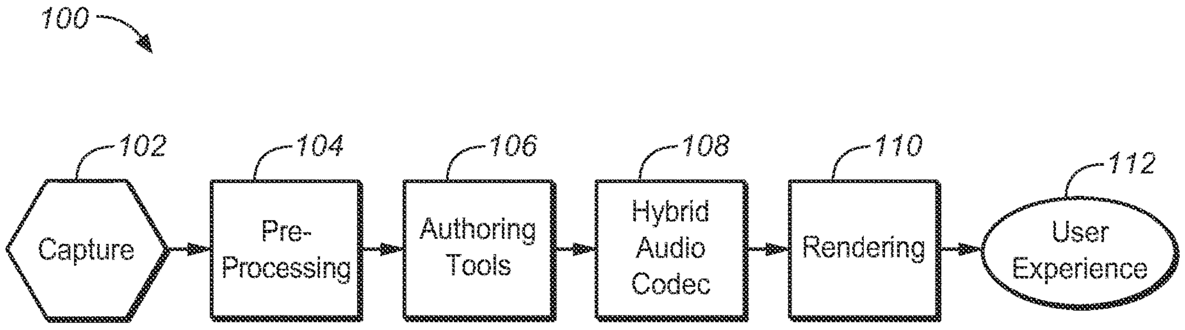
FIG. 1 is a top-level overview of an audio creation and playback environment utilizing an adaptive audio system, under an embodiment.

Systems and methods are described for an adaptive audio system and associated audio signal and data format that supports multiple rendering technologies. Aspects of the one or more embodiments described herein may be implemented in an audio or audio-visual system that processes source audio information in a mixing, rendering and playback system that includes one or more computers or processing devices executing software instructions. Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

For purposes of the present description, the following terms have the associated meanings:

Channel or audio channel: a monophonic audio signal or an audio stream plus metadata in which the position is coded as a channel ID, e.g., Left Front or Right Top Surround. A channel object may drive multiple speakers, e.g., the Left Surround channels (Ls) will feed all the speakers in the Ls array.

Channel Configuration: a pre-defined set of speaker zones with associated nominal locations, e.g., 5.1, 7.1, and so on; 5.1 refers to a six-channel surround sound audio system having front left and right channels, center channel, two surround channels, and a subwoofer channel; 7.1 refers to an eight-channel surround system that adds two additional surround channels to the 5.1 system. Examples of 5.1 and 7.1 configurations include Dolby® surround systems.

Speaker: an audio transducer or set of transducers that render an audio signal.

Speaker Zone: an array of one or more speakers can be uniquely referenced and that receive a single audio signal, e.g., Left Surround as typically found in cinema, and in particular for exclusion or inclusion for object rendering.

Speaker Channel or Speaker-feed Channel: an audio channel that is associated with a named speaker or speaker zone within a defined speaker configuration. A speaker channel is nominally rendered using the associated speaker zone.

Speaker Channel Group: a set of one or more speaker channels corresponding to a channel configuration (e.g., a stereo track, mono track, etc.)

Object or Object Channel one or more audio channels with a parametric source description, such as apparent source position (e.g., 3D coordinates), apparent source width, etc. An audio stream plus metadata in which the position is coded as 3D position in space.

Audio Program: the complete set of speaker channels and/or object channels and associated metadata that describes the desired spatial audio presentation.

Allocentric reference: a spatial reference in which audio objects are defined relative to features within the rendering environment such as room walls and corners, standard speaker locations, and screen location (e.g., front left corner of a room).

Egocentric reference: a spatial reference in which audio objects are defined relative to the perspective of the (audience) listener and often specified with respect to angles relative to a listener (e.g., 30 degrees right of the listener).

Frame: frames are short, independently decodable segments into which a total audio program is divided. The audio frame rate and boundary is typically aligned with the video frames.

Adaptive audio channel-based and/or object-based audio signals plus metadata that renders the audio signals based on the playback environment.

The cinema sound format and processing system described herein, also referred to as an "adaptive audio system," utilizes a new spatial audio description and rendering technology to allow enhanced audience immersion, more artistic control, system flexibility and scalability, and ease of installation and maintenance. Embodiments of a cinema audio platform include several discrete components including mixing tools, packer/encoder, unpack/decoder, in-theater final mix and rendering components, new speaker designs, and networked amplifiers. The system includes recommendations for a new channel configuration to be used by content creators and exhibitors. The system utilizes a model-based description that supports several features such as: single inventory with downward and upward adaption to rendering configuration, i.e., delay rendering and enabling optimal use of available speakers; improved sound envelopment, including optimized downmixing to avoid inter-channel correlation; increased spatial resolution through steer-thru arrays (e.g., an audio object dynamically assigned to one or more speakers within a surround array); and support for alternate rendering methods.

FIG. 1 is a top-level overview of an audio creation and playback environment utilizing an adaptive audio system, under an embodiment. As shown in FIG. 1, a comprehensive, end-to-end environment 100 includes content creation, packaging, distribution and playback/rendering components across a wide number of end-point devices and use cases. The overall system 100 originates with content captured from and for a number of different use cases that comprise different user experiences 112. The content capture element 102 includes, for example, cinema, TV, live broadcast, user generated content, recorded content, games, music, and the like, and may include audio/visual or pure audio content. The content, as it progresses through the system 100 from the capture stage 102 to the final user experience 112, traverses several key processing steps through discrete system components. These process steps include pre-processing of the audio 104, authoring tools and processes 106, encoding by an audio codec 108 that captures, for example, audio data, additional metadata and reproduction information, and object channels. Various processing effects, such as compression (lossy or lossless), encryption, and the like may be applied to the object channels for efficient and secure distribution through various mediums. Appropriate end-point-specific decoding and rendering processes 110 are then applied to reproduce and convey a particular adaptive audio user experience 112. The audio experience 112 represents the playback of the audio or audio/visual content through appropriate speakers and playback devices, and may represent any environment in which a listener is experiencing playback of the captured content, such as a cinema, concert hall, outdoor theater, a home or room, listening booth, car, game console, headphone or headset system, public address (PA) system, or any other playback environment.

The embodiment of system 100 includes an audio codec 108 that is capable of efficient distribution and storage of multichannel audio programs, and hence may be referred to as a 'hybrid' codec. The codec 108 combines traditional channel-based audio data with associated metadata to produce audio objects that facilitate the creation and delivery of audio that is adapted and optimized for rendering and playback in environments that maybe different from the mixing environment. This allows the sound engineer to encode his or her intent with respect to how the final audio should be heard by the listener, based on the actual listening environment of the listener.

Conventional channel-based audio codecs operate under the assumption that the audio program will be reproduced by an array of speakers in predetermined positions relative to the listener. To create a complete multichannel audio program, sound engineers typically mix a large number of separate audio streams (e.g., dialog, music, effects) to create the overall desired impression. Audio mixing decisions are typically made by listening to the audio program as reproduced by an array of speakers in the predetermined positions, e.g., a particular 5.1 or 7.1 system in a specific theatre. The final, mixed signal serves as input to the audio codec. For reproduction, the spatially accurate sound fields are achieved only when the speakers are placed in the predetermined positions.

A new form of audio coding called audio object coding provides distinct sound sources (audio objects) as input to the encoder in the form of separate audio streams. Examples of audio objects include dialog tracks, single instruments, individual sound effects, and other point sources. Each audio object is associated with spatial parameters, which may include, but are not limited to, sound position, sound width, and velocity information. The audio objects and associated parameters are then coded for distribution and storage. Final audio object mixing and rendering is performed at the receive end of the audio distribution chain, as part of audio program playback. This step may be based on knowledge of the actual speaker positions so that the result is an audio distribution system that is customizable to user-specific listening conditions. The two coding forms, channel-based and object-based, perform optimally for different input signal conditions. Channel-based audio coders are generally more efficient for coding input signals containing dense mixtures of different audio sources and for diffuse sounds. Conversely, audio object coders are more efficient for coding a small number of highly directional sound sources.

In an embodiment, the methods and components of system 100 comprise an audio encoding, distribution, and decoding system configured to generate one or more bitstreams containing both conventional channel-based audio elements and audio object coding elements. Such a combined approach provides greater coding efficiency and rendering flexibility compared to either channel-based or object-based approaches taken separately.

Other aspects of the described embodiments include extending a predefined channel-based audio codec in a backwards-compatible manner to include audio object coding elements. A new 'extension layer' containing the audio object coding elements is defined and added to the 'base' or 'backwards compatible' layer of the channel-based audio codec bitstream. This approach enables one or more bitstreams, which include the extension layer to be processed by legacy decoders, while providing an enhanced listener experience for users with new decoders. One example of an enhanced user experience includes control of audio object rendering. An additional advantage of this approach is that audio objects may be added or modified anywhere along the distribution chain without decoding/mixing/re-encoding multichannel audio encoded with the channel-based audio codec.

With regard to the frame of reference, the spatial effects of audio signals are critical in providing an immersive experience for the listener. Sounds that are meant to emanate from a specific region of a viewing screen or room should be played through speaker(s) located at that same relative location. Thus, the primary audio metadatum of a sound event in a model-based description is position, though other parameters such as size, orientation, velocity and acoustic dispersion can also be described. To convey position, a model-based, 3D, audio spatial description requires a 3D coordinate system. The coordinate system used for transmission (Euclidean, spherical, etc) is generally chosen for convenience or compactness, however, other coordinate systems may be used for the rendering processing. In addition to a coordinate system, a frame of reference is required for representing the locations of objects in space. For systems to accurately reproduce position-based sound in a variety of different environments, selecting the proper frame of reference can be a critical factor. With an allocentric reference frame, an audio source position is defined relative to features within the rendering environment such as room walls and corners, standard speaker locations, and screen location. In an egocentric reference frame, locations are represented with respect to the perspective of the listener, such as "in front of me, slightly to the left," and so on. Scientific studies of spatial perception (audio and otherwise), have shown that the egocentric perspective is used almost universally. For cinema however, allocentric is generally more appropriate for several reasons. For example, the precise location of an audio object is most important when there is an associated object on screen. Using an allocentric reference, for every listening position, and for any screen size, the sound will localize at the same relative position on the screen, e.g., one-third left of the middle of the screen. Another reason is that mixers tend to think and mix in allocentric terms, and panning tools are laid out with an allocentric frame (the room walls), and mixers expect them to be rendered that way, e.g., this sound should be on screen, this sound should be off screen, or from the left wall, etc.

Despite the use of the allocentric frame of reference in the cinema environment, there are some cases where an egocentric frame of reference may be useful, and more appropriate. These include non-diegetic sounds, i.e., those that are not present in the "story space," e.g., mood music, for which an egocentrically uniform presentation may be desirable. Another case is near-field effects (e.g., a buzzing mosquito in the listener's left ear) that require an egocentric representation. Currently there are no means for rendering such a sound field short of using headphones or very near field speakers. In addition, infinitely far sound sources (and the resulting plane waves) appear to come from a constant egocentric position (e.g., 30 degrees to the left), and such sounds are easier to describe in egocentric terms than in allocentric terms.

In some cases, it is possible to use an allocentric frame of reference as long as a nominal listening position is defined, while some examples require an egocentric representation that are not yet possible to render. Although an allocentric reference may be more useful and appropriate, the audio representation should be extensible, since many new features, including egocentric representation may be more desirable in certain applications and listening environments. Embodiments of the adaptive audio system include a hybrid spatial description approach that includes a recommended channel configuration for optimal fidelity and for rendering of diffuse or complex, multi-point sources (e.g., stadium crowd, ambiance) using an egocentric reference, plus an allocentric, model-based sound description to efficiently enable increased spatial resolution and scalability.

System Components

With reference to FIG. 1, the original sound content data 102 is first processed in a pre-processing block 104. The pre-processing block 104 of system 100 includes an object channel filtering component. In many cases, audio objects contain individual sound sources to enable independent panning of sounds. In some cases, such as when creating audio programs using natural or "production" sound, it may be necessary to extract individual sound objects from a recording that contains multiple sound sources. Embodiments include a method for isolating independent source signals from a more complex signal. Undesirable elements to be separated from independent source signals may include, but are not limited to, other independent sound sources and background noise. In addition, reverb may be removed to recover "dry" sound sources.

The pre-processor 104 also includes source separation and content type detection functionality. The system provides for automated generation of metadata through analysis of input audio. Positional metadata is derived from a multi-channel recording through an analysis of the relative levels of correlated input between channel pairs. Detection of content type, such as "speech" or "music", may be achieved, for example, by feature extraction and classification.

Authoring Tools

The authoring tools block 106 includes features to improve the authoring of audio programs by optimizing the input and codification of the sound engineer's creative intent allowing him to create the final audio mix once that is optimized for playback in practically any playback environment. This is accomplished through the use of audio objects and positional data that is associated and encoded with the original audio content. In order to accurately place sounds around an auditorium the sound engineer needs control over how the sound will ultimately be rendered based on the actual constraints and features of the playback environment. The adaptive audio system provides this control by allowing the sound engineer to change how the audio content is designed and mixed through the use of audio objects and positional data.

Audio objects can be considered as groups of sound elements that may be perceived to emanate from a particular physical location or locations in the auditorium. Such objects can be static, or they can move. In the adaptive audio system 100, the audio objects are controlled by metadata, which among other things, details the position of the sound at a given point in time. When objects are monitored or played back in a theatre, they are rendered according to the positional metadata using the speakers that are present, rather than necessarily being output to a physical channel. A track in a session can be an audio object, and standard panning data is analogous to positional metadata. In this way, content placed on the screen might pan in effectively the same way as with channel-based content, but content placed in the surrounds can be rendered to an individual speaker if desired. While the use of audio objects provides desired control for discrete effects, other aspects of a movie soundtrack do work effectively in a channel-based environment. For example, many ambient effects or reverberation actually benefit from being fed to arrays of speakers. Although these could be treated as objects with sufficient width to fill an array, it is beneficial to retain some channel-based functionality.

In an embodiment, the adaptive audio system supports 'beds' in addition to audio objects, where beds are effectively channel-based sub-mixes or stems. These can be delivered for final playback (rendering) either individually, or combined into a single bed, depending on the intent of the content creator. These beds can be created in different channel-based configurations such as 5.1, 7.1, and are extensible to more extensive formats such as 9.1, and arrays that include overhead speakers.

Figure 2:
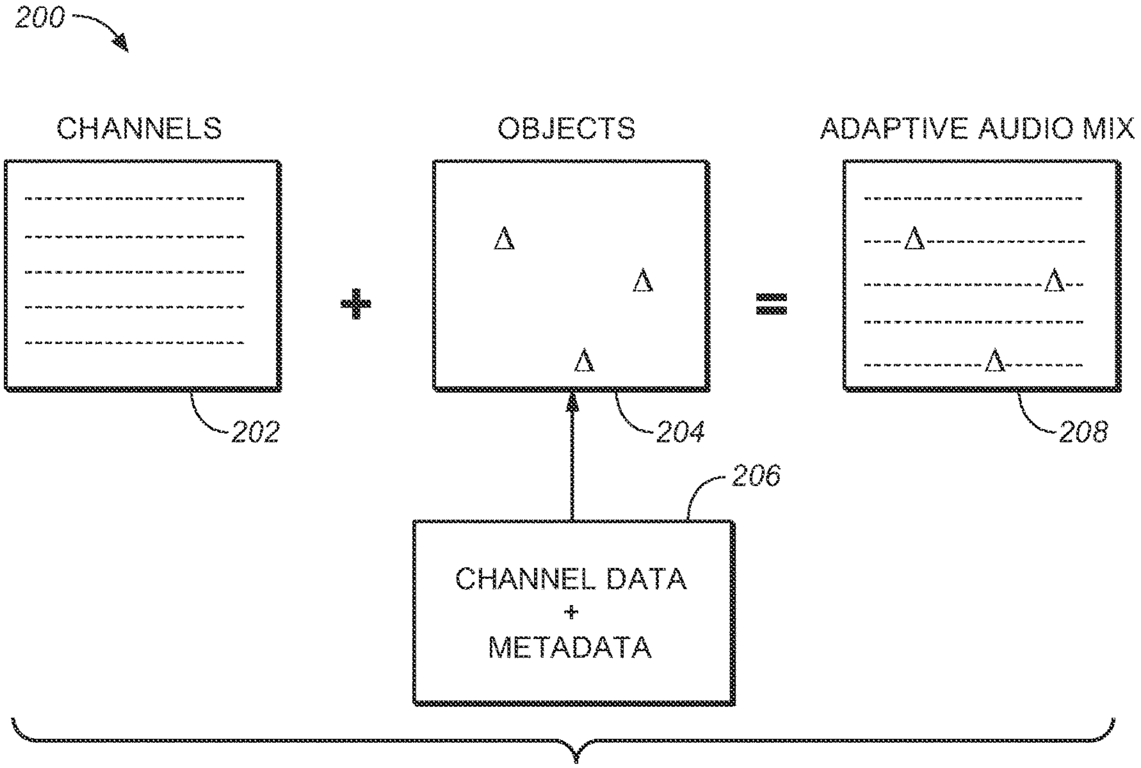
FIG. 2 illustrates the combination of channel and object-based data to produce an adaptive audio mix, under an embodiment.

FIG. 2 illustrates the combination of channel and object-based data to produce an adaptive audio mix, under an embodiment. As shown in process 200, the channel-based data 202, which, for example, may be 5.1 or 7.1 surround sound data provided in the form of pulse-code modulated (PCM) data is combined with audio object data 204 to produce an adaptive audio mix 208. The audio object data 204 is produced by combining the elements of the original channel-based data with associated metadata that specifies certain parameters pertaining to the location of the audio objects.

As shown conceptually in FIG. 2, the authoring tools provide the ability to create audio programs that contain a combination of speaker channel groups and object channels simultaneously. For example, an audio program could contain one or more speaker channels optionally organized into groups (or tracks, e.g., a stereo or 5.1 track), descriptive metadata for one or more speaker channels, one or more object channels, and descriptive metadata for one or more object channels. Within one audio program, each speaker channel group, and each object channel may be represented using one or more different sample rates. For example, Digital Cinema (D-Cinema) applications support 48 kHz and 96 kHz sample rates, but other sample rates may also be supported. Furthermore, ingest, storage and editing of channels with different sample rates may also be supported.

The creation of an audio program requires the step of sound design, which includes combining sound elements as a sum of level adjusted constituent sound elements to create a new, desired sound effect. The authoring tools of the adaptive audio system enable the creation of sound effects as a collection of sound objects with relative positions using a spatio-visual sound design graphical user interface. For example, a visual representation of the sound generating object (e.g., a car) can be used as a template for assembling audio elements (exhaust note, tire hum, engine noise) as object channels containing the sound and the appropriate spatial position (at the tail pipe, the tires, the hood). The individual object channels can then be linked and manipulated as a group. The authoring tool 106 includes several user interface elements to allow the sound engineer to input control information and view mix parameters, and improve the system functionality. The sound design and authoring process is also improved by allowing object channels and speaker channels to be linked and manipulated as a group. One example is combining an object channel with a discrete, dry sound source with a set of speaker channels that contain an associated reverb signal.

The audio authoring tool 106 supports the ability to combine multiple audio channels, commonly referred to as mixing. Multiple methods of mixing are supported, and may include traditional level-based mixing and loudness based mixing. In level-based mixing, wideband scaling is applied to the audio channels, and the scaled audio channels are then summed together. The wideband scale factors for each channel are chosen to control the absolute level of the resulting mixed signal, and also the relative levels of the mixed channels within the mixed signal. In loudness-based mixing, one or more input signals are modified using frequency dependent amplitude scaling, where the frequency dependent amplitude is chosen to provide the desired perceived absolute and relative loudness, while preserving the perceived timbre of the input sound.

The authoring tools allow for the ability to create speaker channels and speaker channel groups. This allows metadata to be associated with each speaker channel group. Each speaker channel group can be tagged according to content type. The content type is extensible via a text description. Content types may include, but are not limited to, dialog, music, and effects. Each speaker channel group may be assigned unique instructions on how to upmix from one channel configuration to another, where upmixing is defined as the creation of M audio channels from N channels where M>N. Upmix instructions may include, but are not limited to, the following: an enable/disable flag to indicate if upmixing is permitted; an upmix matrix to control the mapping between each input and output channel; and default enable and matrix settings may be assigned based on content type, e.g., enable upmixing for music only. Each speaker channel group may also be assigned unique instructions on how to downmix from one channel configuration to another, where downmixing is defined as the creation of Y audio channels from X channels where Y<X. Downmix instructions may include, but are not limited to, the following: a matrix to control the mapping between each input and output channel; and default matrix settings can be assigned based on content type, e.g., dialog shall downmix onto screen; effects shall downmix off the screen. Each speaker channel can also be associated with a metadata flag to disable bass management during rendering.

Embodiments include a feature that enables the creation of object channels and object channel groups. This invention allows metadata to be associated with each object channel group. Each object channel group can be tagged according to content type. The content type is extensible via a text description, wherein the content types may include, but are not limited to, dialog, music, and effects. Each object channel group can be assigned metadata to describe how the object(s) should be rendered.

Position information is provided to indicate the desired apparent source position. Position may be indicated using an egocentric or allocentric frame of reference. The egocentric reference is appropriate when the source position is to be referenced to the listener. For egocentric position, spherical coordinates are useful for position description. An allocentric reference is the typical frame of reference for cinema or other audio/visual presentations where the source position is referenced relative to objects in the presentation environment such as a visual display screen or room boundaries. Three-dimensional (3D) trajectory information is provided to enable the interpolation of position or for use of other rendering decisions such as enabling a "snap to mode." Size information is provided to indicate the desired apparent perceived audio source size.

Spatial quantization is provided through a "snap to closest speaker" control that indicates an intent by the sound engineer or mixer to have an object rendered by exactly one speaker (with some potential sacrifice to spatial accuracy). A limit to the allowed spatial distortion can be indicated through elevation and azimuth tolerance thresholds such that if the threshold is exceeded, the "snap" function will not occur. In addition to distance thresholds, a crossfade rate parameter can be indicated to control how quickly a moving object will transition or jump from one speaker to another when the desired position crosses between to speakers.

In an embodiment, dependent spatial metadata is used for certain position metadata. For example, metadata can be automatically generated for a "slave" object by associating it with a "master" object that the slave object is to follow. A time lag or relative speed can be assigned to the slave object. Mechanisms may also be provided to allow for the definition of an acoustic center of gravity for sets or groups of objects, so that an object may be rendered such that it is perceived to move around another object. In such a case, one or more objects may rotate around an object or a defined area, such as a dominant point, or a dry area of the room. The acoustic center of gravity would then be used in the rendering stage to help determine location information for each appropriate object-based sound, even though the ultimate location information would be expressed as a location relative to the room, as opposed to a location relative to another object.

When an object is rendered, it is assigned to one or more speakers according to the position metadata, and the location of the playback speakers. Additional metadata may be associated with the object to limit the speakers that shall be used. The use of restrictions can prohibit the use of indicated speakers or merely inhibit the indicated speakers (allow less energy into the speaker or speakers than would otherwise be applied). The speaker sets to be restricted may include, but are not limited to, any of the named speakers or speaker zones (e.g., L, C, R, etc.), or speaker areas, such as: front wall, back wall, left wall, right wall, ceiling, floor, speakers within the room, and so on. Likewise, in the course of specifying the desired mix of multiple sound elements, it is possible to cause one or more sound elements to become inaudible or "masked" due to the presence of other "masking" sound elements. For example, when masked elements are detected, they could be identified to the user via a graphical display.

As described elsewhere, the audio program description can be adapted for rendering on a wide variety of speaker installations and channel configurations. When an audio program is authored, it is important to monitor the effect of rendering the program on anticipated playback configurations to verify that the desired results are achieved. This invention includes the ability to select target playback configurations and monitor the result. In addition, the system can automatically monitor the worst case (i.e., highest) signal levels that would be generated in each anticipated playback configuration, and provide an indication if clipping or limiting will occur.

Figure 3:
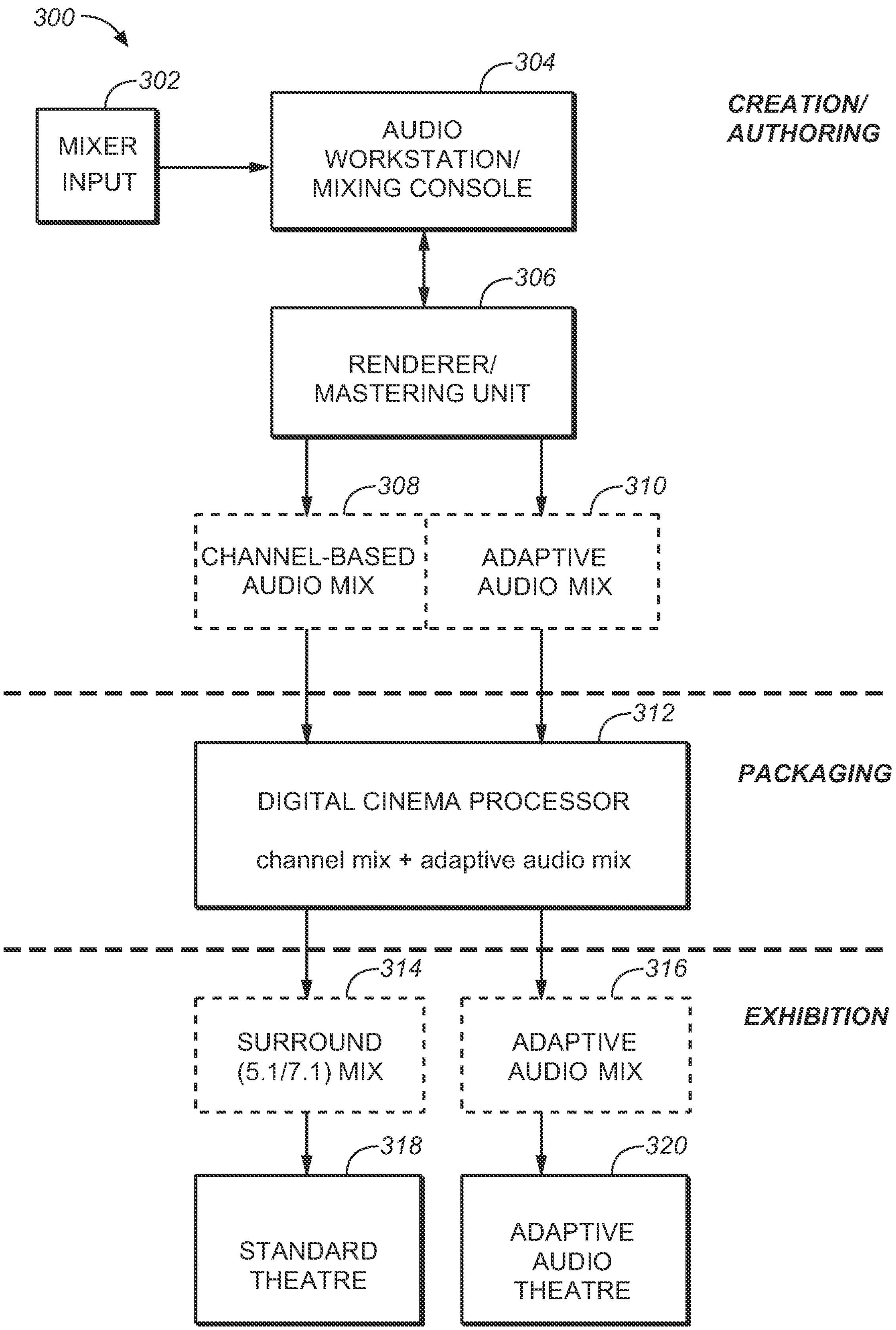
FIG. 3 is a block diagram illustrating the workflow of creating, packaging and rendering adaptive audio content, under an embodiment.

FIG. 3 is a block diagram illustrating the workflow of creating, packaging and rendering adaptive audio content, under an embodiment. The workflow 300 of FIG. 3 is divided into three distinct task groups labeled creation/authoring, packaging, and exhibition. In general, the hybrid model of beds and objects shown in FIG. 2 allows most sound design, editing, pre-mixing, and final mixing to be performed in the same manner as they are today and without adding excessive overhead to present processes. In an embodiment, the adaptive audio functionality is provided in the form of software, firmware or circuitry that is used in conjunction with sound production and processing equipment, wherein such equipment may be new hardware systems or updates to existing systems. For example, plug-in applications may be provided for digital audio workstations to allow existing panning techniques within sound design and editing to remain unchanged. In this way, it is possible to lay down both beds and objects within the workstation in 5.1 or similar surround-equipped editing rooms. Object audio and metadata is recorded in the session in preparation for the pre- and final-mix stages in the dubbing theatre.

As shown in FIG. 3, the creation or authoring tasks involve inputting mixing controls 302 by a user, e.g., a sound engineer in the following example, to a mixing console or audio workstation 304. In an embodiment, metadata is integrated into the mixing console surface, allowing the channel strips' faders, panning and audio processing to work with both beds or stems and audio objects. The metadata can be edited using either the console surface or the workstation user interface, and the sound is monitored using a rendering and mastering unit (RMU) 306. The bed and object audio data and associated metadata is recorded during the mastering session to create a 'print master,' which includes an adaptive audio mix 310 and any other rendered deliverables (such as a surround 7.1 or 5.1 theatrical mix) 308. Existing authoring tools (e.g., digital audio workstations such as Pro Tools) may be used to allow sound engineers to label individual audio tracks within a mix session. Embodiments extend this concept by allowing users to label individual sub-segments within a track to aid in finding or quickly identifying audio elements. The user interface to the mixing console that enables definition and creation of the metadata may be implemented through graphical user interface elements, physical controls (e.g., sliders and knobs), or any combination thereof.

In the packaging stage, the print master file is wrapped using industry-standard MXF wrapping procedures, hashed and optionally encrypted in order to ensure integrity of the audio content for delivery to the digital cinema packaging facility. This step may be performed by a digital cinema processor (DCP) 312 or any appropriate audio processor depending on the ultimate playback environment, such as a standard surround-sound equipped theatre 318, an adaptive audio-enabled theatre 320, or any other playback environment. As shown in FIG. 3, the processor 312 outputs the appropriate audio signals 314 and 316 depending on the exhibition environment.

In an embodiment, the adaptive audio print master contains an adaptive audio mix, along with a standard DCI-compliant Pulse Code Modulated (PCM) mix. The PCM mix can be rendered by the rendering and mastering unit in a dubbing theatre, or created by a separate mix pass if desired. PCM audio forms the standard main audio track file within the digital cinema processor 312, and the adaptive audio forms an additional track file. Such a track file may be compliant with existing industry standards, and is ignored by DCI-compliant servers that cannot use it.

In an example cinema playback environment, the DCP containing an adaptive audio track file is recognized by a server as a valid package, and ingested into the server and then streamed to an adaptive audio cinema processor. A system that has both linear PCM and adaptive audio files available, the system can switch between them as necessary. For distribution to the exhibition stage, the adaptive audio packaging scheme allows the delivery of a single type of package to be delivered to a cinema. The DCP package contains both PCM and adaptive audio files. The use of security keys, such as a key delivery message (KDM) may be incorporated to enable secure delivery of movie content, or other similar content.

As shown in FIG. 3, the adaptive audio methodology is realized by enabling a sound engineer to express his or her intent with regard to the rendering and playback of audio content through the audio workstation 304. By controlling certain input controls, the engineer is able to specify where and how audio objects and sound elements are played back depending on the listening environment. Metadata is generated in the audio workstation 304 in response to the engineer's mixing inputs 302 to provide rendering queues that control spatial parameters (e.g., position, velocity, intensity, timbre, etc.) and specify which speaker(s) or speaker groups in the listening environment play respective sounds during exhibition. The metadata is associated with the respective audio data in the workstation 304 or RMU 306 for packaging and transport by DCP 312.

A graphical user interface and software tools that provide control of the workstation 304 by the engineer comprise at least part of the authoring tools 106 of FIG. 1.

Hybrid Audio Codec

As shown in FIG. 1, system 100 includes a hybrid audio codec 108. This component comprises an audio encoding, distribution, and decoding system that is configured to generate a single bitstream containing both conventional channel-based audio elements and audio object coding elements. The hybrid audio coding system is built around a channel-based encoding system that is configured to generate a single (unified) bitstream that is simultaneously compatible with (i.e., decodable by) a first decoder configured to decode audio data encoded in accordance with a first encoding protocol (channel-based) and one or more secondary decoders configured to decode audio data encoded in accordance with one or more secondary encoding protocols (object-based). The bitstream can include both encoded data (in the form of data bursts) decodable by the first decoder (and ignored by any secondary decoders) and encoded data (e.g., other bursts of data) decodable by one or more secondary decoders (and ignored by the first decoder). The decoded audio and associated information (metadata) from the first and one or more of the secondary decoders can then be combined in a manner such that both the channel-based and object-based information is rendered simultaneously to recreate a facsimile of the environment, channels, spatial information, and objects presented to the hybrid coding system (i.e., within a 3D space or listening environment).

The codec 108 generates a bitstream containing coded audio information and information relating to multiple sets of channel positions (speakers). In one embodiment, one set of channel positions is fixed and used for the channel based encoding protocol, while another set of channel positions is adaptive and used for the audio object based encoding protocol, such that the channel configuration for an audio object may change as a function of time (depending on where the object is placed in the sound field). Thus, the hybrid audio coding system may carry information about two sets of speaker locations for playback, where one set may be fixed and be a subset of the other. Devices supporting legacy coded audio information would decode and render the audio information from the fixed subset, while a device capable of supporting the larger set could decode and render the additional coded audio information that would be time-varyingly assigned to different speakers from the larger set. Moreover, the system is not dependent on the first and one or more of the secondary decoders being simultaneously present within a system and/or device. Hence, a legacy and/or existing device/system containing only a decoder supporting the first protocol would yield a fully compatible sound field to be rendered via traditional channel-based reproduction systems. In this case, the unknown or unsupported portion(s) of the hybrid-bitstream protocol (i.e., the audio information represented by a secondary encoding protocol) would be ignored by the system or device decoder supporting the first hybrid encoding protocol.

In another embodiment, the codec 108 is configured to operate in a mode where the first encoding subsystem (supporting the first protocol) contains a combined representation of all the sound field information (channels and objects) represented in both the first and one or more of the secondary encoder subsystems present within the hybrid encoder. This ensures that the hybrid bitstream includes backward compatibility with decoders supporting only the first encoder subsystem's protocol by allowing audio objects (typically carried in one or more secondary encoder protocols) to be represented and rendered within decoders supporting only the first protocol.

In yet another embodiment, the codec 108 includes two or more encoding subsystems, where each of these subsystems is configured to encode audio data in accordance with a different protocol, and is configured to combine the outputs of the subsystems to generate a hybrid-format (unified) bitstream.

One of the benefits the embodiments is the ability for a hybrid coded audio bitstream to be carried over a wide-range of content distribution systems, where each of the distribution systems conventionally supports only data encoded in accordance with the first encoding protocol. This eliminates the need for any system and/or transport level protocol modifications/changes in order to specifically support the hybrid coding system.

Audio encoding systems typically utilize standardized bitstream elements to enable the transport of additional (arbitrary) data within the bitstream itself. This additional (arbitrary) data is typically skipped (i.e., ignored) during decoding of the encoded audio included in the bitstream, but may be used for a purpose other than decoding. Different audio coding standards express these additional data fields using unique nomenclature. Bitstream elements of this general type may include, but are not limited to, auxiliary data, skip fields, data stream elements, fill elements, ancillary data, and substream elements. Unless otherwise noted, usage of the expression "auxiliary data" in this document does not imply a specific type or format of additional data, but rather should be interpreted as a generic expression that encompasses any or all of the examples associated with the present invention.

A data channel enabled via "auxiliary" bitstream elements of a first encoding protocol within a combined hybrid coding system bitstream could carry one or more secondary (independent or dependent) audio bitstreams (encoded in accordance with one or more secondary encoding protocols). The one or more secondary audio bitstreams could be split into N-sample blocks and multiplexed into the "auxiliary data" fields of a first bitstream. The first bitstream is decodable by an appropriate (complement) decoder. In addition, the auxiliary data of the first bitstream could be extracted, recombined into one or more secondary audio bitstreams, decoded by a processor supporting the syntax of one or more of the secondary bitstreams, and then combined and rendered together or independently. Moreover, it is also possible to reverse the roles of the first and second bitstreams, so that blocks of data of a first bitstream are multiplexed into the auxiliary data of a second bitstream.

Bitstream elements associated with a secondary encoding protocol also carry and convey information (metadata) characteristics of the underlying audio, which may include, but are not limited to, desired sound source position, velocity, and size. This metadata is utilized during the decoding and rendering processes to re-create the proper (i.e., original) position for the associated audio object carried within the applicable bitstream. It is also possible to carry the metadata described above, which is applicable to the audio objects contained in the one or more secondary bitstreams present in the hybrid stream, within bitstream elements associated with the first encoding protocol.

Bitstream elements associated with either or both the first and second encoding protocols of the hybrid coding system carry/convey contextual metadata that identify spatial parameters (i.e., the essence of the signal properties itself) and further information describing the underlying audio essence type in the form of specific audio classes that are carried within the hybrid coded audio bitstream. Such metadata could indicate, for example, the presence of spoken dialogue, music, dialogue over music, applause, singing voice, etc., and could be utilized to adaptively modify the behavior of interconnected pre or post processing modules upstream or downstream of the hybrid coding system.

In an embodiment, the codec 108 is configured to operate with a shared or common bit pool in which bits available for coding are "shared" between all or part of the encoding subsystems supporting one or more protocols. Such a codec may distribute the available bits (from the common "shared" bit pool) between the encoding subsystems in order to optimize the overall audio quality of the unified bitstream.

For example, during a first time interval, the codec may assign more of the available bits to a first encoding subsystem, and fewer of the available bits to the remaining subsystems, while during a second time interval, the codec may assign fewer of the available bits to the first encoding subsystem, and more of the available bits to the remaining subsystems. The decision of how to assign bits between encoding subsystems may be dependent, for example, on results of statistical analysis of the shared bit pool, and/or analysis of the audio content encoded by each subsystem. The codec may allocate bits from the shared pool in such a way that a unified bitstream constructed by multiplexing the outputs of the encoding subsystems maintains a constant frame length/bitrate over a specific time interval. It is also possible, in some cases, for the frame length/bitrate of the unified bitstream to vary over a specific time interval.

In an alternative embodiment, the codec 108 generates a unified bitstream including data encoded in accordance with the first encoding protocol configured and transmitted as an independent substream of an encoded data stream (which a decoder supporting the first encoding protocol will decode), and data encoded in accordance with a second protocol sent as an independent or dependent substream of the encoded data stream (one which a decoder supporting the first protocol will ignore). More generally, in a class of embodiments the codec generates a unified bitstream including two or more independent or dependent substreams (where each substream includes data encoded in accordance with a different or identical encoding protocol).

In yet another alternative embodiment, the codec 108 generates a unified bitstream including data encoded in accordance with the first encoding protocol configured and transmitted with a unique bitstream identifier (which a decoder supporting a first encoding protocol associated with the unique bitstream identifier will decode), and data encoded in accordance with a second protocol configured and transmitted with a unique bitstream identifier, which a decoder supporting the first protocol will ignore. More generally, in a class of embodiments the codec generates a unified bitstream including two or more substreams (where each substream includes data encoded in accordance with a different or identical encoding protocol and where each carries a unique bitstream identifier). The methods and systems for creating a unified bitstream described above provide the ability to unambiguously signal (to a decoder) which interleaving and/or protocol has been utilized within a hybrid bitstream (e.g., to signal whether the AUX data, SKIP, DSE or the substream approach described in the is utilized).

The hybrid coding system is configured to support de-interleaving/demultiplexing and re-interleaving/re-multiplexing of bitstreams supporting one or more secondary protocols into a first bitstream (supporting a first protocol) at any processing point found throughout a media delivery system. The hybrid codec is also configured to be capable of encoding audio input streams with different sample rates into one bitstream. This provides a means for efficiently coding and distributing audio sources containing signals with inherently different bandwidths. For example, dialog tracks typically have inherently lower bandwidth than music and effects tracks.

Rendering

Under an embodiment, the adaptive audio system allows multiple (e.g., up to 128) tracks to be packaged, usually as a combination of beds and objects. The basic format of the audio data for the adaptive audio system comprises a number of independent monophonic audio streams. Each stream has associated with it metadata that specifies whether the stream is a channel-based stream or an object-based stream. The channel-based streams have rendering information encoded by means of channel name or label; and the object-based streams have location information encoded through mathematical expressions encoded in further associated metadata. The original independent audio streams are then packaged as a single serial bitstream that contains all of the audio data in an ordered fashion. This adaptive data configuration allows for the sound to be rendered according to an allocentric frame of reference, in which the ultimate rendering location of a sound is based on the playback environment to correspond to the mixer's intent. Thus, a sound can be specified to originate from a frame of reference of the playback room (e.g., middle of left wall), rather than a specific labeled speaker or speaker group (e.g., left surround). The object position metadata contains the appropriate allocentric frame of reference information required to play the sound correctly using the available speaker positions in a room that is set up to play the adaptive audio content.

Figures 4, 5:
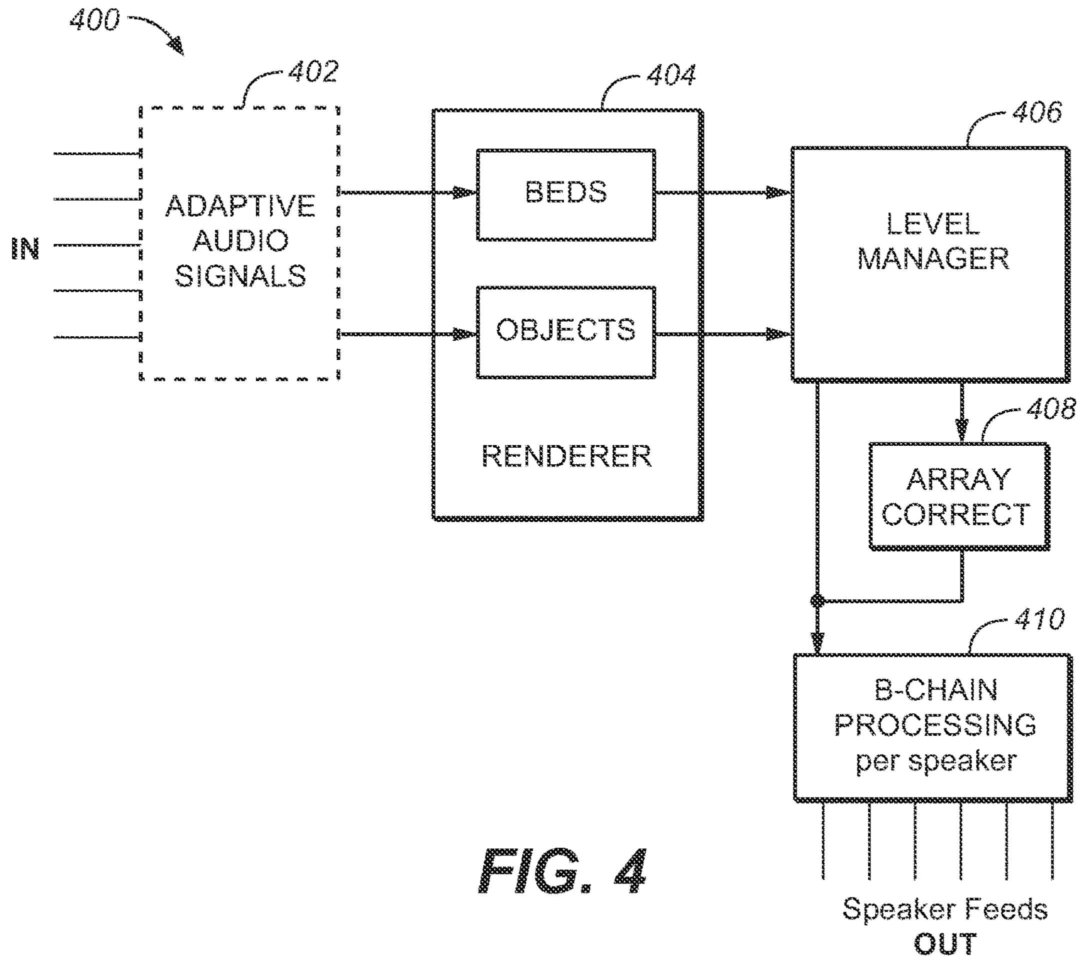
FIG. 4 is a block diagram of a rendering stage of an adaptive audio system, under an embodiment.
FIG. 5 is a table that lists the metadata types and associated metadata elements for the adaptive audio system, under an embodiment.

The renderer takes the bitstream encoding the audio tracks, and processes the content according to the signal type. Beds are fed to arrays, which will potentially require different delays and equalization processing than individual objects. The process supports rendering of these beds and objects to multiple (up to 64) speaker outputs. FIG. 4 is a block diagram of a rendering stage of an adaptive audio system, under an embodiment. As shown in system 400 of FIG. 4, a number of input signals, such as up to 128 audio tracks that comprise the adaptive audio signals 402 are provided by certain components of the creation, authoring and packaging stages of system 300, such as RMU 306 and processor 312. These signals comprise the channel-based beds and objects that are utilized by the renderer 404. The channel-based audio (beds) and objects are input to a level manager 406 that provides control over the output levels or amplitudes of the different audio components. Certain audio components may be processed by an array correction component 408. The adaptive audio signals are then passed through a B-chain processing component 410, which generates a number (e.g., up to 64) of speaker feed output signals. In general, the B-chain feeds refer to the signals processed by power amplifiers, crossovers and speakers, as opposed to A-chain content that constitutes the sound track on the film stock.

In an embodiment, the renderer 404 runs a rendering algorithm that intelligently uses the surround speakers in the theatre to the best of their ability. By improving the power handling and frequency response of the surround speakers, and keeping the same monitoring reference level for each output channel or speaker in the theatre, objects being panned between screen and surround speakers can maintain their sound pressure level and have a closer timbre match without, importantly, increasing the overall sound pressure level in the theatre. An array of appropriately-specified surround speakers will typically have sufficient headroom to reproduce the maximum dynamic range available within a surround 7.1 or 5.1 soundtrack (i.e., 20 dB above reference level), however it is unlikely that a single surround speaker will have the same headroom of a large multi-way screen speaker. As a result, there will likely be instances when an object placed in the surround field will require a sound pressure greater than that attainable using a single surround speaker. In these cases, the renderer will spread the sound across an appropriate number of speakers in order to achieve the required sound pressure level. The adaptive audio system improves the quality and power handling of surround speakers to provide an improvement in the faithfulness of the rendering. It provides support for bass management of the surround speakers through the use of optional rear subwoofers that allows each surround speaker to achieve improved power handling, and simultaneously potentially utilizing smaller speaker cabinets. It also allows the addition of side surround speakers closer to the screen than current practice to ensure that objects can smoothly transition from screen to surround.

Through the use of metadata to specify location information of audio objects along with certain rendering processes, system 400 provides a comprehensive, flexible method for content creators to move beyond the constraints of existing systems. As stated previously current systems create and distribute audio that is fixed to particular speaker locations with limited knowledge of the type of content conveyed in the audio essence (the part of the audio that is played back). The adaptive audio system 100 provides a new hybrid approach that includes the option for both speaker location specific audio (left channel, right channel, etc.) and object oriented audio elements that have generalized spatial information which may include, but are not limited to position, size and velocity. This hybrid approach provides a balanced approach for fidelity (provided by fixed speaker locations) and flexibility in rendering (generalized audio objects). The system also provides additional useful information about the audio content that is paired with the audio essence by the content creator at the time of content creation. This information provides powerful, detailed information on the attributes of the audio that can be used in very powerful ways during rendering. Such attributes may include, but are not limited to, content type (dialog, music, effect, Foley, back ground/ambience, etc.), spatial attributes (3D position, 3D size, velocity), and rendering information (snap to speaker location, channel weights, gain, bass management information, etc.).

The adaptive audio system described herein provides powerful information that can be used for rendering by a widely varying number of end points. In many cases the optimal rendering technique applied depends greatly on the end point device. For example, home theater systems and soundbars may have 2, 3, 5, 7 or even 9 separate speakers. Many other types of systems, such as televisions, computers, and music docks have only two speakers, and nearly all commonly used devices have a binaural headphone output (PC, laptop, tablet, cell phone, music player, etc.). However, for traditional audio that is distributed today (mono, stereo, 5.1, 7.1 channels) the end point devices often need to make simplistic decisions and compromises to render and reproduce audio that is now distributed in a channel/speaker specific form. In addition, there is little or no information conveyed about the actual content that is being distributed (dialog, music, ambience, etc.) and little or no information about the content creator's intent for audio reproduction. However, the adaptive audio system 100 provides this information and, potentially, access to audio objects, which can be used to create a compelling next generation user experience.

The system 100 allows the content creator to embed the spatial intent of the mix within the bitstream using metadata such as position, size, velocity, and so on, through a unique and powerful metadata and adaptive audio transmission format. This allows a great deal of flexibility in the spatial reproduction of audio. From a spatial rendering standpoint, adaptive audio enables the adaptation of the mix to the exact position of the speakers in a particular room in order to avoid spatial distortion that occurs when the geometry of the playback system is not identical to the authoring system. In current audio reproduction systems where only audio for a speaker channel is sent, the intent of the content creator is unknown. System 100 uses metadata conveyed throughout the creation and distribution pipeline. An adaptive audio-aware reproduction system can use this metadata information to reproduce the content in a manner that matches the original intent of the content creator. Likewise, the mix can be adapted to the exact hardware configuration of the reproduction system. At present, there exist many different possible speaker configurations and types in rendering equipment such as television, home theaters, soundbars, portable music player docks, etc. When these systems are sent channel specific audio information today (i.e., left and right channel audio or multichannel audio) the system must process the audio to appropriately match the capabilities of the rendering equipment. An example is standard stereo audio being sent to a soundbar with more than two speakers. In current audio reproduction where only audio for a speaker channel is sent, the intent of the content creator is unknown. Through the use of metadata conveyed throughout the creation and distribution pipeline, an adaptive audio aware reproduction system can use this information to reproduce the content in a manner that matches the original intent of the content creator. For example, some soundbars have side firing speakers to create a sense of envelopment. With adaptive audio, spatial information and content type (such as ambient effects) can be used by the soundbar to send only the appropriate audio to these side firing speakers.

The adaptive audio system allows for unlimited interpolation of speakers in a system on all front/back, left/right, up/down, near/far dimensions. In current audio reproduction systems, no information exists for how to handle audio where it may be desired to position the audio such that it is perceived by a listener to be between two speakers. At present, with audio that is only assigned to a specific speaker, a spatial quantization factor is introduced. With adaptive audio, the spatial positioning of the audio can be known accurately and reproduced accordingly on the audio reproduction system.

With respect to headphone rendering, the creator's intent is realized by matching Head Related Transfer Functions (HRTF) to the spatial position. When audio is reproduced over headphones, spatial virtualization can be achieved by the application of a Head Related Transfer Function, which processes the audio, adding perceptual cues that create the perception of the audio being played in 3D space and not over headphones. The accuracy of the spatial reproduction is dependent on the selection of the appropriate HRTF, which can vary based on several factors including the spatial position. Using the spatial information provided by the Adaptive Audio system can result in the selection of one or a continuing varying number of HRTFs to greatly improve the reproduction experience.

The spatial information conveyed by the adaptive audio system can be not only used by a content creator to create a compelling entertainment experience (film, television, music, etc.), but the spatial information can also indicate where a listener is positioned relative to physical objects such as buildings or geographic points of interest. This would allow the user to interact with a virtualized audio experience that is related to the real-world, i.e., augmented reality.

Embodiments also enable spatial upmixing, by performing enhanced upmixing by reading the metadata only if the objects audio data are not available. Knowing the position of all objects and their types allows the upmixer to better differentiate elements within the channel-based tracks. Existing upmixing algorithms have to infer information such as the audio content type (speech, music, ambient effects) as well as the position of different elements within the audio stream to create a high quality upmix with minimal or no audible artifacts. Many times, the inferred information may be incorrect or inappropriate. With adaptive audio, the additional information available from the metadata related to, for example, audio content type, spatial position, velocity, audio object size, etc., can be used by an upmixing algorithm to create a high quality reproduction result. The system also spatially matches the audio to the video by accurately positioning the audio object of the screen to visual elements. In this case, a compelling audio/video reproduction experience is possible, particularly with larger screen sizes, if the reproduced spatial location of some audio elements match image elements on the screen. An example is having the dialog in a film or television program spatially coincide with a person or character that is speaking on the screen. With normal speaker channel based audio there is no easy method to determine where the dialog should be spatially positioned to match the location of the person or character on-screen. With the audio information available with adaptive audio, such audio/visual alignment can be achieved. The visual positional and audio spatial alignment can also be used for non-character/dialog objects such as cars, trucks, animation, and so on.

A spatial masking processing is facilitated by system 100, since knowledge of the spatial intent of a mix through the adaptive audio metadata means that the mix can be adapted to any speaker configuration. However, one runs the risk of downmixing objects in the same or almost the same location because of the playback system limitations. For example, an object meant to be panned in the left rear might be downmixed to the left front if surround channels are not present, but if a louder element occurs in the left front at the same time, the downmixed object will be masked and disappear from the mix. Using adaptive audio metadata, spatial masking may be anticipated by the renderer, and the spatial and or loudness downmix parameters of each object may be adjusted so all audio elements of the mix remain just as perceptible as in the original mix. Because the renderer understands the spatial relationship between the mix and the playback system, it has the ability to "snap" objects to the closest speakers instead of creating a phantom image between two or more speakers. While this may slightly distort the spatial representation of the mix, it also allows the renderer to avoid an unintended phantom image. For example, if the angular position of the mixing stage's left speaker does not correspond to the angular position of the playback system's left speaker, using the snap to closest speaker function could avoid having the playback system reproduce a constant phantom image of the mixing stage's left channel.

With respect to content processing, the adaptive audio system 100 allows the content creator to create individual audio objects and add information about the content that can be conveyed to the reproduction system. This allows a large amount of flexibility in the processing of audio prior to reproduction. From a content processing and rendering standpoint, the adaptive audio system enables processing to be adapted to the type of object. For example, dialog enhancement may be applied to dialog objects only. Dialog enhancement refers to a method of processing audio that contains dialog such that the audibility and/or intelligibility of the dialog is increased and or improved. In many cases the audio processing that is applied to dialog is inappropriate for non-dialog audio content (i.e., music, ambient effects, etc.) and can result in objectionable audible artifacts. With adaptive audio, an audio object could contain only the dialog in a piece of content, and it can be labeled accordingly so that a rendering solution could selectively apply dialog enhancement to only the dialog content. In addition, if the audio object is only dialog (and not a mixture of dialog and other content which is often the case), then the dialog enhancement processing can process dialog exclusively (thereby limiting any processing being performed on any other content). Likewise, bass management (filtering, attenuation, gain) can be targeted at specific objects based on their type. Bass management refers to selectively isolating and processing only the bass (or lower) frequencies in a particular piece of content. With current audio systems and delivery mechanisms this is a "blind" process that is applied to all of the audio. With adaptive audio, specific audio objects for which bass management is appropriate can be identified by the metadata, and the rendering processing can be applied appropriately.

The adaptive audio system 100 also provides for object based dynamic range compression and selective upmixing. Traditional audio tracks have the same duration as the content itself, while an audio object might occur for only a limited amount of time in the content. The metadata associated with an object can contain information about its average and peak signal amplitude, as well as its onset or attack time (particularly for transient material). This information would allow a compressor to better adapt its compression and time constants (attack, release, etc.) to better suit the content. For selective upmixing, content creators might choose to indicate in the adaptive audio bitstream whether an object should be upmixed or not. This information allows the Adaptive Audio renderer and upmixer to distinguish which audio elements can be safely upmixed, while respecting the creator's intent.

Embodiments also allow the adaptive audio system to select a preferred rendering algorithm from a number of available rendering algorithms and/or surround sound formats. Examples of available rendering algorithms include: binaural, stereo dipole, Ambisonics, Wave Field Synthesis (WFS), multi-channel panning, raw stems with position metadata. Others include dual balance, and vector-based amplitude panning.

The binaural distribution format uses a two-channel representation of a sound field in terms of the signal present at the left and right ears. Binaural information can be created via in-ear recording or synthesized using HRTF models. Playback of a binaural representation is typically done over headphones, or by employing cross-talk cancellation. Playback over an arbitrary speaker set-up would require signal analysis to determine the associated sound field and/or signal source(s).

The stereo dipole rendering method is a transaural cross-talk cancellation process to make binaural signals playable over stereo speakers (e.g., at + and −10 degrees off center).

Ambisonics is a (distribution format and a rendering method) that is encoded in a four channel form called B-format. The first channel, W, is the non-directional pressure signal; the second channel, X, is the directional pressure gradient containing the front and back information; the third channel, Y, contains the left and right, and the Z the up and down. These channels define a first order sample of the complete soundfield at a point. Ambisonics uses all available speakers to recreate the sampled (or synthesized) soundfield within the speaker array such that when some speakers are pushing, others are pulling.

Wave Field Synthesis is a rendering method of sound reproduction, based on the precise construction of the desired wave field by secondary sources. WFS is based on Huygens' principle, and is implemented as speaker arrays (tens or hundreds) that ring the listening space and operate in a coordinated, phased fashion to re-create each individual sound wave.

Multi-channel panning is a distribution format and/or rendering method, and may be referred to as channel-based audio. In this case, sound is represented as a number of discrete sources to be played back through an equal number of speakers at defined angles from the listener. The content creator/mixer can create virtual images by panning signals between adjacent channels to provide direction cues; early reflections, reverb, etc., can be mixed into many channels to provide direction and environmental cues.

Raw stems with position metadata is a distribution format, and may also be referred to as object-based audio. In this format, distinct, "close mic'ed," sound sources are represented along with position and environmental metadata. Virtual sources are rendered based on the metadata and playback equipment and listening environment.

The adaptive audio format is a hybrid of the multi-channel panning format and the raw stems format. The rendering method in a present embodiment is multi-channel panning. For the audio channels, the rendering (panning) happens at authoring time, while for objects the rendering (panning) happens at playback.

Metadata and Adaptive Audio Transmission Format

As stated above, metadata is generated during the creation stage to encode certain positional information for the audio objects and to accompany an audio program to aid in rendering the audio program, and in particular, to describe the audio program in a way that enables rendering the audio program on a wide variety of playback equipment and playback environments. The metadata is generated for a given program and the editors and mixers that create, collect, edit and manipulate the audio during post-production. An important feature of the adaptive audio format is the ability to control how the audio will translate to playback systems and environments that differ from the mix environment. In particular, a given cinema may have lesser capabilities than the mix environment.

The adaptive audio renderer is designed to make the best use of the equipment available to re-create the mixer's intent. Further, the adaptive audio authoring tools allow the mixer to preview and adjust how the mix will be rendered on a variety of playback configurations. All of the metadata values can be conditioned on the playback environment and speaker configuration. For example, a different mix level for a given audio element can be specified based on the playback configuration or mode. In an embodiment, the list of conditioned playback modes is extensible and includes the following: (1) channel-based only playback: 5.1, 7.1, 7.1 (height), 9.1; and (2) discrete speaker playback: 3D, 2D (no height).

In an embodiment, the metadata controls or dictates different aspects of the adaptive audio content and is organized based on different types including: program metadata, audio metadata, and rendering metadata (for channel and object). Each type of metadata includes one or more metadata items that provide values for characteristics that are referenced by an identifier (ID). FIG. 5 is a table that lists the metadata types and associated metadata elements for the adaptive audio system, under an embodiment.

As shown in table 500 of FIG. 5, the first type of metadata is program metadata, which includes metadata elements that specify the frame rate, track count, extensible channel description, and mix stage description. The frame rate metadata element specifies the rate of the audio content frames in units of frames per second (fps). The raw audio format need not include framing of the audio or metadata since the audio is provided as full tracks (duration of a reel or entire feature) rather than audio segments (duration of an object). The raw format does need to carry all the information required to enable the adaptive audio encoder to frame the audio and metadata, including the actual frame rate. Table 1 shows the ID, example values and description of the frame rate metadata element.

TABLE 1

| ID | Values | Description 2 |
|---|---|---|
| FrameRate | 24, 25, 30, 48, 50, 60, 96, 100, 120, extensible (frames/sec) | Indication of intended frame rate for entire program. Field shall provide efficient coding of common rates, as well as ability to extend to extensible floating point field with 0.01 resolution. |

The track count metadata element indicates the number of audio tracks in a frame. An example adaptive audio decoder/processor can support up to 128 simultaneous audio tracks, while the adaptive audio format will support any number of audio tracks. Table 2 shows the ID, example values and description of the track count metadata element.

TABLE 2

| ID | Values | Description 2 |
|---|---|---|
| nTracks | Positive integer, extensible range. | Indication of number of audio tracks in the frame. |

Channel-based audio can be assigned to non-standard channels and the extensible channel description metadata element enables mixes to use new channel positions. For each extension channel the following metadata shall be provided as shown in Table 3:

TABLE 3

| ID | Values | Description 2 |
|---|---|---|
| ExtChanPosition | x, y, z coordinates. | Position |
| ExtChanWidth | x, y, z coordinates. | Width |

The mix stage description metadata element specifies the frequency at which a particular speaker produces half the power of the passband. Table 4 shows the ID, example values and description of the mix stage description metadata element, where LF=Low Frequency; HF=High Frequency; 3 dB point=edge of speaker passband.

TABLE 4

| ID | Values | Description |
|---|---|---|
| nMixSpeakers | Positive integer | |
| MixSpeakerPos | x, y, z coordinates for each speaker | |
| MixSpeakerTyp | {FR, LLF, Sub}, | Full range, Limited LF |

TABLE 4-continued

| ID | Values | Description |
|---|---|---|
| | for each speaker | response, Subwoofer |
| MixSpeaker3dB | Positive integer (Hz), for each speaker. | LF 3 dB point for FR and LLF speakers, HF 3 dB point for Sub speaker types. Can be used to match spectral reproduction capabilities of the mix stage equipment |
| MixChannel | {L, C, R, Ls, Rs, Lss, Rss, Lrs, Rrs, Lts, Rts, none, other}, for each speaker | speaker -> channel mapping. Use "none" for speakers that are not associated |
| MixSpeakerSub | List of (Gain, Speaker number) pairs. Gain is real value: 0 <= Gain <= 1.0. Speaker number is an integer. 0 < Speaker number < nMixSpeakers − 1 | Speaker -> sub mapping. Used to indicate target sub-woofer for bass management of each speaker. Each speaker can be bass managed to more than one sub. Gain indicates portion of bass signal that should go to each sub. Gain = 0 indicates end of list, and a Speaker number does not follow. If a speaker is not bass managed, first Gain value is set to 0. |
| MixPos | x, y, z coordinates for mix position | Nominal mix position |
| MixRoomDim | x, y, z for room dimensions (meters) | Nominal mix stage dimensions |
| MixRoomRT60 | Real value < 20. | Nominal mix stage RT60 |
| MixScreenDim | x, y, z for screen dimensions (meters) | |
| MixScreenPos | x, y, z for screen center (meters) | |

As shown in FIG. 5, the second type of metadata is audio metadata. Each channel-based or object-based audio element consists of audio essence and metadata. The audio essence is a monophonic audio stream carried on one of many audio tracks. The associated metadata describes how the audio essence is stored (audio metadata, e.g., sample rate) or how it should be rendered (rendering metadata, e.g., desired audio source position). In general, the audio tracks are continuous through the duration of the audio program. The program editor or mixer is responsible for assigning audio elements to tracks. The track use is expected to be sparse, i.e., median simultaneous track use may be only 16 to 32. In a typical implementation, the audio will be efficiently transmitted using a lossless encoder. However, alternate implementations are possible, for instance transmitting uncoded audio data or lossily coded audio data. In a typical implementation, the format consists of up to 128 audio tracks where each track has a single sample rate and a single coding system. Each track lasts the duration of the feature (no explicit reel support). The mapping of objects to tracks (time multiplexing) is the responsibility of the content creator (mixer).

As shown in FIG. 3, the audio metadata includes the elements of sample rate, bit depth, and coding systems. Table 5 shows the ID, example values and description of the sample rate metadata element.

TABLE 5

| ID | Values | Description |
|---|---|---|
| SampleRate | 16, 24, 32, 44.1, 48, 88.2 96, and extensible (x1000 samples/sec) | SampleRate field shall provide efficient coding of common rates, as well as ability to extend to extensible floating point field with 0.01 resolution |

Table 6 shows the ID, example values and description of the bit depth metadata element (for PCM and lossless compression).

TABLE 6

| ID | Values | Description |
|---|---|---|
| BitDepth | Positive integer up to 32 | Indication of sample bit depth. Samples shall be left justified if bit depth is smaller than the container (i.e. zero-fill LSBs) |

Table 7 shows the ID, example values and description of the coding system metadata element.

TABLE 7

| ID | Value | Description |
|---|---|---|
| Codec | PCM, Lossless, extensible | Indication of audio format. Each audio track can be assigned any supported coding type |
| | STAGE 1 | STAGE 2 |
| GroupNumber | Positive integer | Object grouping information. Applies to Audio Objects and Channel Objects, e.g. to indicate stems. |
| AudioTyp | {dialog, music, effects, m&e, undef, other} | Audio type. List shall be extensible and include the following: Undefined, Dialog, Music, Effects, Foley, Ambience, Other. |
| AudioTypTxt | Free text description | |

As shown in FIG. 5, the third type of metadata is rendering metadata. The rendering metadata specifies values that help the renderer to match as closely as possible the original mixer intent regardless of the playback environment. The set of metadata elements are different for channel-based audio and object-based audio. A first rendering metadata field selects between the two types of audio—channel-based or object-based, as shown in Table 8.

TABLE 8

| ID | Value | STAGE 2 |
|---|---|---|
| ChanOrObj | {Channel, Object} | For each audio element, indicate whether it is described using Object or Channel metadata |

The rendering metadata for the channel-based audio comprises a position metadata element that specifies the audio source position as one or more speaker positions. Table 9 shows the ID and values for the position metadata element for the channel-based case.

TABLE 9

| ID | Values | Description |
|---|---|---|
| ChannelPos | {L, C, R, Ls, Rs, Lss, Rss, Lrs, Rrs, Lts, Rts, Lc, Rc, Crs, Cts, other} | Audio source position is indicated as one of a set of named speaker positions. Set is extensible. Position and extent of extension channel(s) is provided by ExtChanPos, and ExtChanWidth. |

The rendering metadata for the channel-based audio also comprises a rendering control element that specifies certain characteristics with regard to playback of channel-based audio, as shown in Table 10.

TABLE 10

| ID | Values | Description |
|---|---|---|
| ChanUpmix | {no, yes} | Disable (default) or enable upmixing |
| ChanUpmixZones | {L, C, R, Ls, Rs, Lss, Rss, Lrs, Rrs, Lts, Rts, Lc, Rc, Crs, Cts, other} | Indication of zones into which upmixing is permissible. |
| ChanDownmixVect | Positive real values <= 1 | Custom Channel Object downmix matrices for specific Channel Configurations. Channel Configuration list shall be extensible and include 5.1 and Dolby Surround 7.1. |
| ChanUpmixVect | Positive real values <= 1 | Custom Channel Object upmix matrices for specific Channel Configurations. Channel Configuration list shall be extensible and include 5.1 and 7.1, and 9.1. |
| ChanSSBias | | Indication of screen to surround bias. Most useful for adjusting the default rendering of alternate playback modes (5.1, 7.1). |

For object-based audio, the metadata includes analogous elements as for the channel-based audio. Table 11 provides the ID and values for the object position metadata element. Object position is described in one of three ways: three-dimensional co-ordinates; a plane and two-dimensional co-ordinates; or a line and a one-dimensional co-ordinate. The rendering method can adapt based on the position information type.

TABLE 11

| ID | Values | Description |
|---|---|---|
| ObjPosFormat | {3D, 2D, 1D} | Position format |
| ObjPos3D | x, y, z coordinates | 3D Position |
| ObjPos2D | 3 sets of x, y, z coordinates to define a plane, and 1 set of x, y coordinates to indicate the position on the plane. | Plane + 2D Position |
| ObjPos1D | 2 set of x, y, z coordinates to define a line, and 1 scalar to indicate the position on the line | Line + 1D Position or Curve + 1D Position |
| ObjPosScreen | {yes, no} | Use screen as reference. Position information should be scaled and shifted based on mix versus exhibition screen size and position. |

The ID and values for the object rendering control metadata elements are shown in Table 12. These values provide additional means to control or optimize rendering for object-based audio.

TABLE 12

| ID | Values | Description |
|---|---|---|
| ObjSpread | x or (x, y, z), Positive reals < 1 | Width of spreading function. Values > 0 indicate more than 1 speaker should be used. As value increases more speakers are used to a greater extent. Spread is indicated as a single value, or independently for each dimension. Can be used to smooth pans, or to create position ambiguity |
| ObjASW | x or (x, y, z), Positive reals < 1 | Apparent Source Width. Larger values indicate larger source width. Can be implemented thru the use of decorrelation. |
| ObjSnap | {yes, no} | Snap to nearest speaker. Useful when point-source timbre is more important than spatial accuracy |
| ObjSnapSmoothing | Positive real value < 10 (in seconds) | Spatial Smoothing time constant for “Snap To” mode. Makes it more of a “Glide To.” |
| ObjSnapTol | Positive real value < 10 | Snap To tolerance: How much spatial error (in normalized distance, room width = 1) to accept before reverting to phantom image. |
| ObjRendAlg | {def, dualBallance, vbap, dbap, 2D, 1D, other} | Def: renderer's choice<br>dualBallance: Dolby method<br>vbap: Vector-based amplitude panning<br>dbap: distance based amplitude panning<br>2D: in conjunction with ObjPos2D. use vbap with only 3 (virtual) source positions.<br>1D: in conjunction with ObjPos1D, use pair-wise pan between 2 (virtual) source positions. |
| ObjZones | Positive real values <= 1 | Degree of contribution of any named speaker zone. Supported speaker zones include: L, C, R, Lss, Rss, Lrs, Rrs, Lts, Rts, Lc, Rc. Speaker zone list shall be extensible to support future zones. |
| ObjLevel | Positive real values <= 2 | Alternative Audio Object level for specific Channel Configurations. Channel Configuration list shall be extensible and include 5.1 and |

TABLE 12-continued

| ID | Values | Description |
|---|---|---|
| | | Dolby Surround 7.1. Object may be attenuated or eliminated completely when rendering to smaller channel configurations. |
| ObjSSBias | | Indication of screen to room bias. Most useful for adjusting the default rendering of alternate playback modes (5.1, 7.1). Considered "optional" because this feature may not require additional metadata - other rendering data could be modified directly (e.g. pan trajectory, downmix matrix). |

In an embodiment, the metadata described above and illustrated in FIG. 5 is generated and stored as one or more files that are associated or indexed with corresponding audio content so that audio streams are processed by the adaptive audio system interpreting the metadata generated by the mixer. It should be noted that the metadata described above is an example set of ID's, values, and definitions, and other or additional metadata elements may be included for use in the adaptive audio system.

In an embodiment, two (or more) sets of metadata elements are associated with each of the channel and object based audio streams. A first set of metadata is applied to the plurality of audio streams for a first condition of the playback environment, and a second set of metadata is applied to the plurality of audio streams for a second condition of the playback environment. The second or subsequent set of metadata elements replaces the first set of metadata elements for a given audio stream based on the condition of the playback environment. The condition may include factors such as room size, shape, composition of material within the room, present occupancy and density of people in the room, ambient noise characteristics, ambient light characteristics, and any other factor that might affect the sound or even mood of the playback environment.

Post-Production and Mastering

The rendering stage 110 of the adaptive audio processing system 100 may include audio post-production steps that lead to the creation of a final mix. In a cinema application, the three main categories of sound used in a movie mix are dialogue, music, and effects. Effects consist of sounds that are not dialogue or music (e.g., ambient noise, background/scene noise). Sound effects can be recorded or synthesized by the sound designer or they can be sourced from effects libraries. A sub-group of effects that involve specific noise sources (e.g., footsteps, doors, etc.) are known as Foley and are performed by Foley actors. The different types of sound are marked and panned accordingly by the recording engineers.

Figure 6:
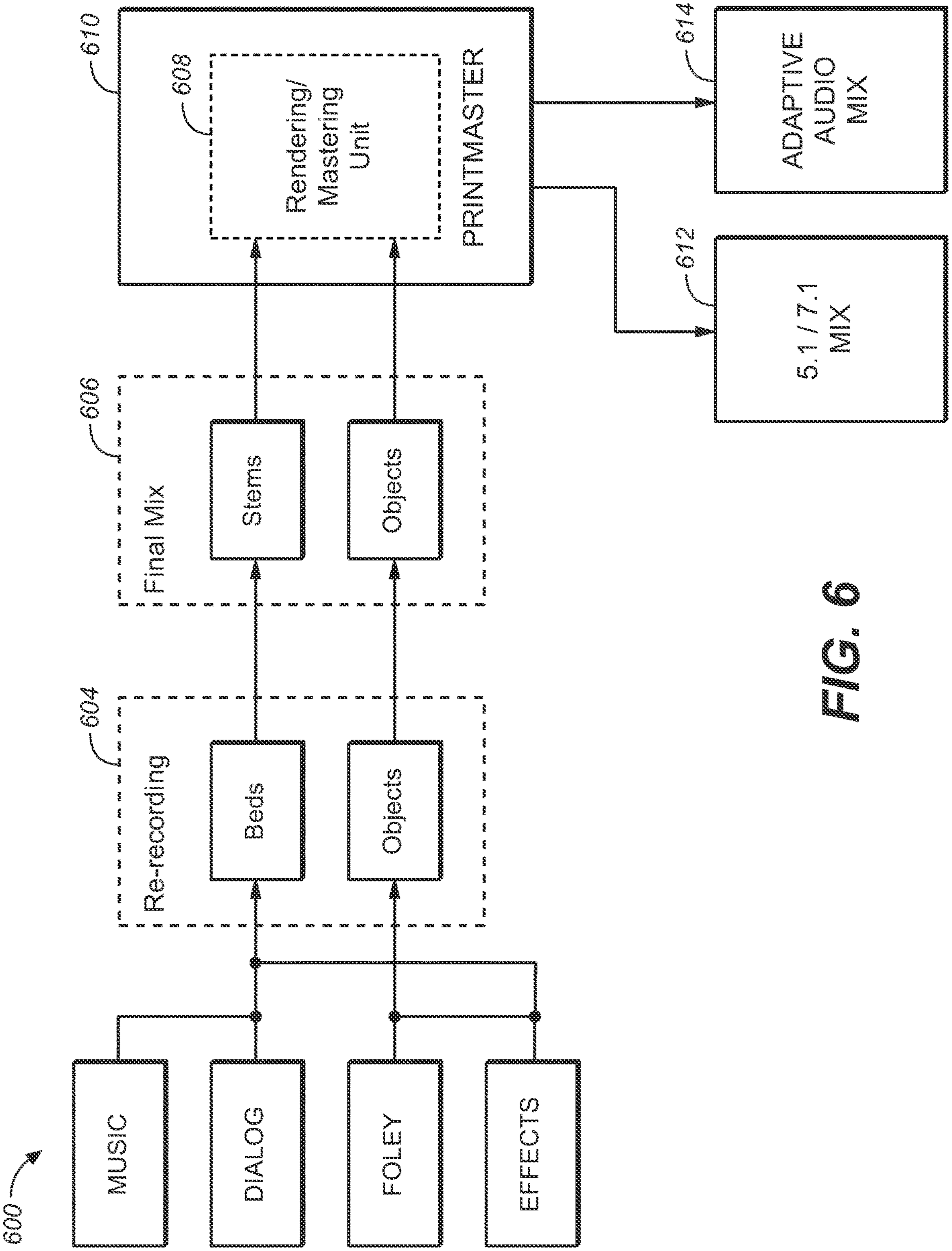
FIG. 6 is a diagram that illustrates a post-production and mastering for an adaptive audio system, under an embodiment.

FIG. 6 illustrates an example workflow for a post-production process in an adaptive audio system, under an embodiment. As shown in diagram 600, all of the individual sound components of music, dialogue, Foley, and effects are brought together in the dubbing theatre during the final mix 606, and the re-recording mixer(s) 604 use the premixes (also known as the 'mix minus') along with the individual sound objects and positional data to create stems as a way of grouping, for example, dialogue, music, effects, Foley and background sounds. In addition to forming the final mix 606, the music and all effects stems can be used as a basis for creating dubbed language versions of the movie. Each stem consists of a channel-based bed and several audio objects with metadata. Stems combine to form the final mix. Using object panning information from both the audio workstation and the mixing console, the rendering and mastering unit 608 renders the audio to the speaker locations in the dubbing theatre. This rendering allows the mixers to hear how the channel-based beds and audio objects combine, and also provides the ability to render to different configurations. The mixer can use conditional metadata, which default to relevant profiles, to control how the content is rendered to surround channels. In this way, the mixers retain complete control of how the movie plays back in all the scalable environments. A monitoring step may be included after either or both of the re-recording step 604 and the final mix step 606 to allow the mixer to hear and evaluate the intermediate content generated during each of these stages.

During the mastering session, the stems, objects, and metadata are brought together in an adaptive audio package 614, which is produced by the printmaster 610. This package also contains the backward-compatible (legacy 5.1 or 7.1) surround sound theatrical mix 612. The rendering/mastering unit (RMU) 608 can render this output if desired; thereby eliminating the need for any additional workflow steps in generating existing channel-based deliverables. In an embodiment, the audio files are packaged using standard Material Exchange Format (MXF) wrapping. The adaptive audio mix master file can also be used to generate other deliverables, such as consumer multi-channel or stereo mixes. The intelligent profiles and conditional metadata allow controlled renderings that can significantly reduce the time required to create such mixes.

In an embodiment, a packaging system can be used to create a digital cinema package for the deliverables including an adaptive audio mix. The audio track files may be locked together to help prevent synchronization errors with the adaptive audio track files. Certain territories require the addition of track files during the packaging phase, for instance, the addition of Hearing Impaired (HI) or Visually Impaired Narration (VI-N) tracks to the main audio track file.

In an embodiment, the speaker array in the playback environment may comprise any number of surround-sound speakers placed and designated in accordance with established surround sound standards. Any number of additional speakers for accurate rendering of the object-based audio content may also be placed based on the condition of the playback environment. These additional speakers may be set up by a sound engineer, and this set up is provided to the system in the form of a set-up file that is used by the system for rendering the object-based components of the adaptive audio to a specific speaker or speakers within the overall speaker array. The set-up file includes at least a list of speaker designations and a mapping of channels to individual speakers, information regarding grouping of speakers, and a run-time mapping based on a relative position of speakers to the playback environment. The run-time mapping is utilized by a snap-to feature of the system that renders point source object-based audio content to a specific speaker that is nearest to the perceived location of the sound as intended by the sound engineer.

Figure 7:
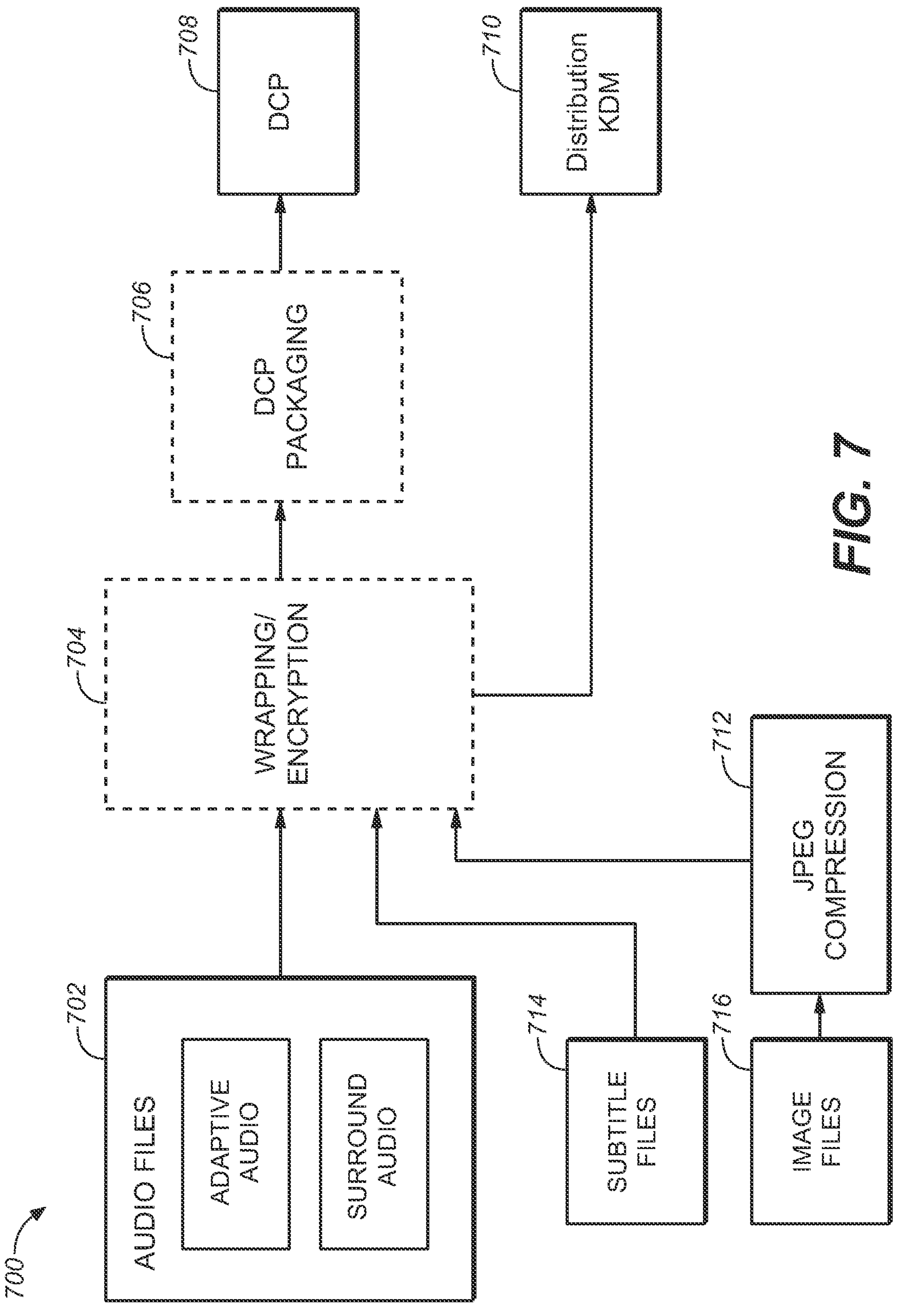
FIG. 7 is a diagram of an example workflow for a digital cinema packaging process using adaptive audio files, under an embodiment.

FIG. 7 is a diagram of an example workflow for a digital cinema packaging process using adaptive audio files, under an embodiment. As shown in diagram 700, the audio files comprising both the adaptive audio files and the 5.1 or 7.1 surround sound audio files are input to a wrapping/encryption block 704. In an embodiment, upon creation of the digital cinema package in block 706, the PCM MXF file (with appropriate additional tracks appended) is encrypted using SMPTE specifications in accordance with existing practice. The adaptive audio MXF is packaged as an auxiliary track file, and is optionally encrypted using a symmetric content key per the SMPTE specification. This single DCP 708 can then be delivered to any Digital Cinema Initiatives (DCI) compliant server. In general, any installations that are not suitably equipped will simply ignore the additional track file containing the adaptive audio soundtrack, and will use the existing main audio track file for standard playback. Installations equipped with appropriate adaptive audio processors will be able to ingest and replay the adaptive audio soundtrack where applicable, reverting to the standard audio track as necessary. The wrapping/encryption component 704 may also provide input directly to a distribution KDM block 710 for generating an appropriate security key for use in the digital cinema server. Other movie elements or files, such as subtitles 714 and images 716 may be wrapped and encrypted along with the audio files 702. In this case, certain processing steps may be included, such as compression 712 in the case of image files 716.

With respect to content management, the adaptive audio system 100 allows the content creator to create individual audio objects and add information about the content that can be conveyed to the reproduction system. This allows a great deal of flexibility in the content management of audio. From a content management standpoint, adaptive audio methods enable several different features. These include changing the language of content by only replacing the dialog object for space saving, download efficiency, geographical playback adaptation, etc. Film, television and other entertainment programs are typically distributed internationally. This often requires that the language in the piece of content be changed depending on where it will be reproduced (French for films being shown in France, German for TV programs being shown in Germany, etc.). Today this often requires a completely independent audio soundtrack to be created, packaged and distributed. With adaptive audio and its inherent concept of audio objects, the dialog for a piece of content could be an independent audio object. This allows the language of the content to be easily changed without updating or altering other elements of the audio soundtrack such as music, effects, etc. This would not only apply to foreign languages but also inappropriate language for certain audiences (e.g., children's television shows, airline movies, etc.), targeted advertising, and so on.

Installation and Equipment Considerations

The adaptive audio file format and associated processors allows for changes in how theatre equipment is installed, calibrated and maintained. With the introduction of many more potential speaker outputs, each individually equalized and balanced, there is a need for intelligent and time-efficient automatic room equalization, which may be performed through the ability to manually adjust any automated room equalization. In an embodiment, the adaptive audio system uses an optimized $1/12^{th}$ octave band equalization engine. Up to 64 outputs can be processed to more accurately balance the sound in theatre. The system also allows scheduled monitoring of the individual speaker outputs, from cinema processor output right through to the sound reproduced in the auditorium. Local or network alerts can be created to ensure that appropriate action is taken. The flexible rendering system may automatically remove a damaged speaker or amplifier from the replay chain and render around it, so allowing the show to go on.

The cinema processor can be connected to the digital cinema server with existing 8×AES main audio connections, and an Ethernet connection for streaming adaptive audio data. Playback of surround 7.1 or 5.1 content uses the existing PCM connections. The adaptive audio data is streamed over Ethernet to the cinema processor for decoding and rendering, and communication between the server and the cinema processor allows the audio to be identified and synchronized. In the event of any issue with the adaptive audio track playback, sound is reverted back to the Dolby Surround 7.1 or 5.1 PCM audio.

Although embodiments have been described with regard to 5.1 and 7.1 surround sound systems, it should be noted that many other present and future surround configurations may be used in conjunction with embodiments including 9.1, 11.1 and 13.1 and beyond.

The adaptive audio system is designed to allow both content creators and exhibitors to decide how sound content is to be rendered in different playback speaker configurations. The ideal number of speaker output channels used will vary accord to room size. Recommended speaker placement is thus dependent on many factors, such as size, composition, seating configuration, environment, average audience sizes, and so on. Example or representative speaker configurations and layouts are provided herein for purposes of illustration only, and are not intended to limit the scope of any claimed embodiments.

The recommended layout of speakers for an adaptive audio system remains compatible with existing cinema systems, which is vital so as not to compromise the playback of existing 5.1 and 7.1 channel-based formats. In order to preserve the intent of the adaptive audio sound engineer, and the intent of mixers of 7.1 and 5.1 content, the positions of existing screen channels should not be altered too radically in an effort to heighten or accentuate the introduction of new speaker locations. In contrast to using all 64 output channels available, the adaptive audio format is capable of being accurately rendered in the cinema to speaker configurations such as 7.1, so even allowing the format (and associated benefits) to be used in existing theatres with no change to amplifiers or speakers.

Different speaker locations can have different effectiveness depending on the theatre design, thus there is at present no industry-specified ideal number or placement of channels. The adaptive audio is intended to be truly adaptable and capable of accurate play back in a variety of auditoriums, whether they have a limited number of playback channels or many channels with highly flexible configurations.

Figure 8:
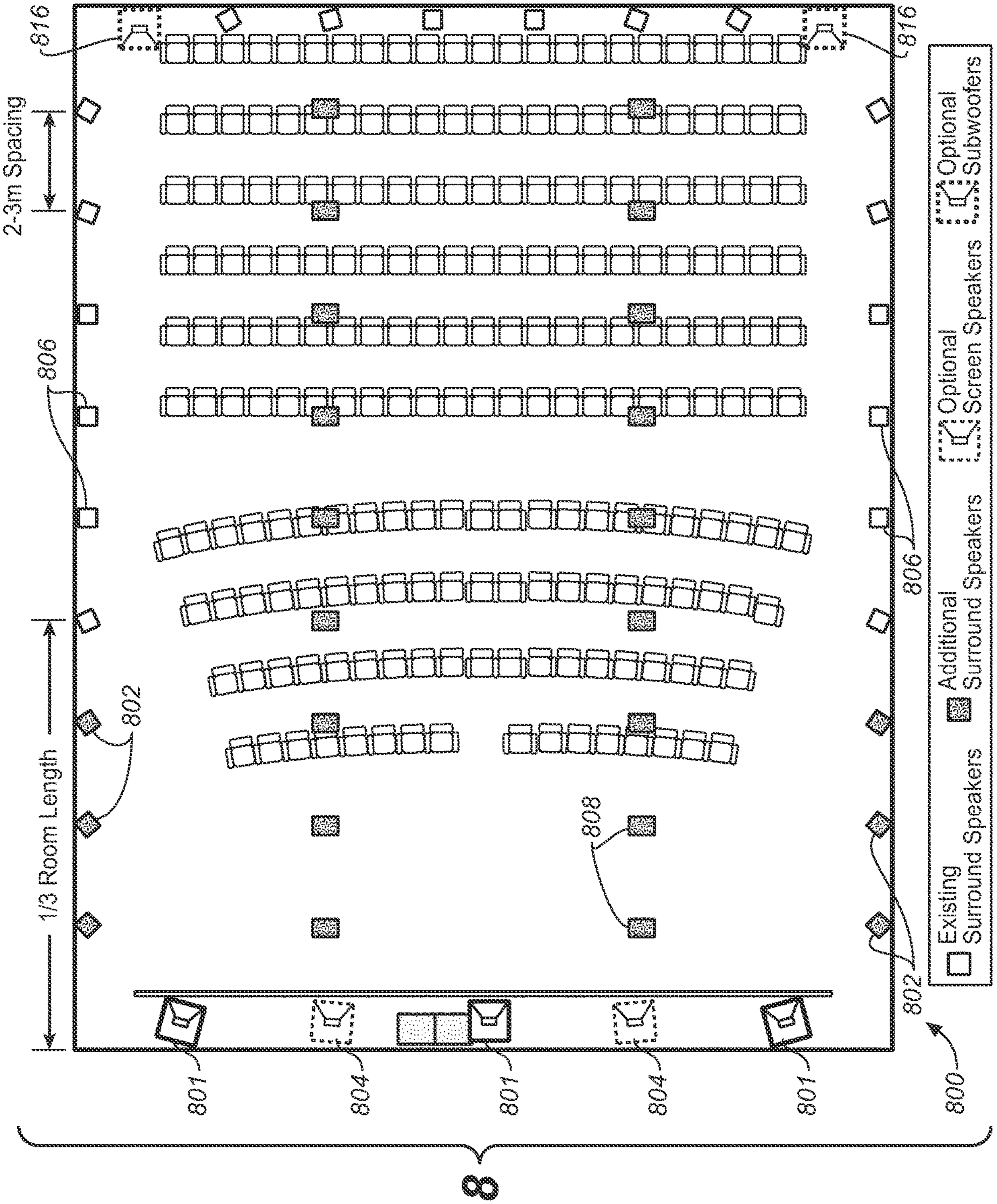
FIG. 8 is an overhead view of an example layout of suggested speaker locations for use with an adaptive audio system in a typical auditorium.
Figure 9:
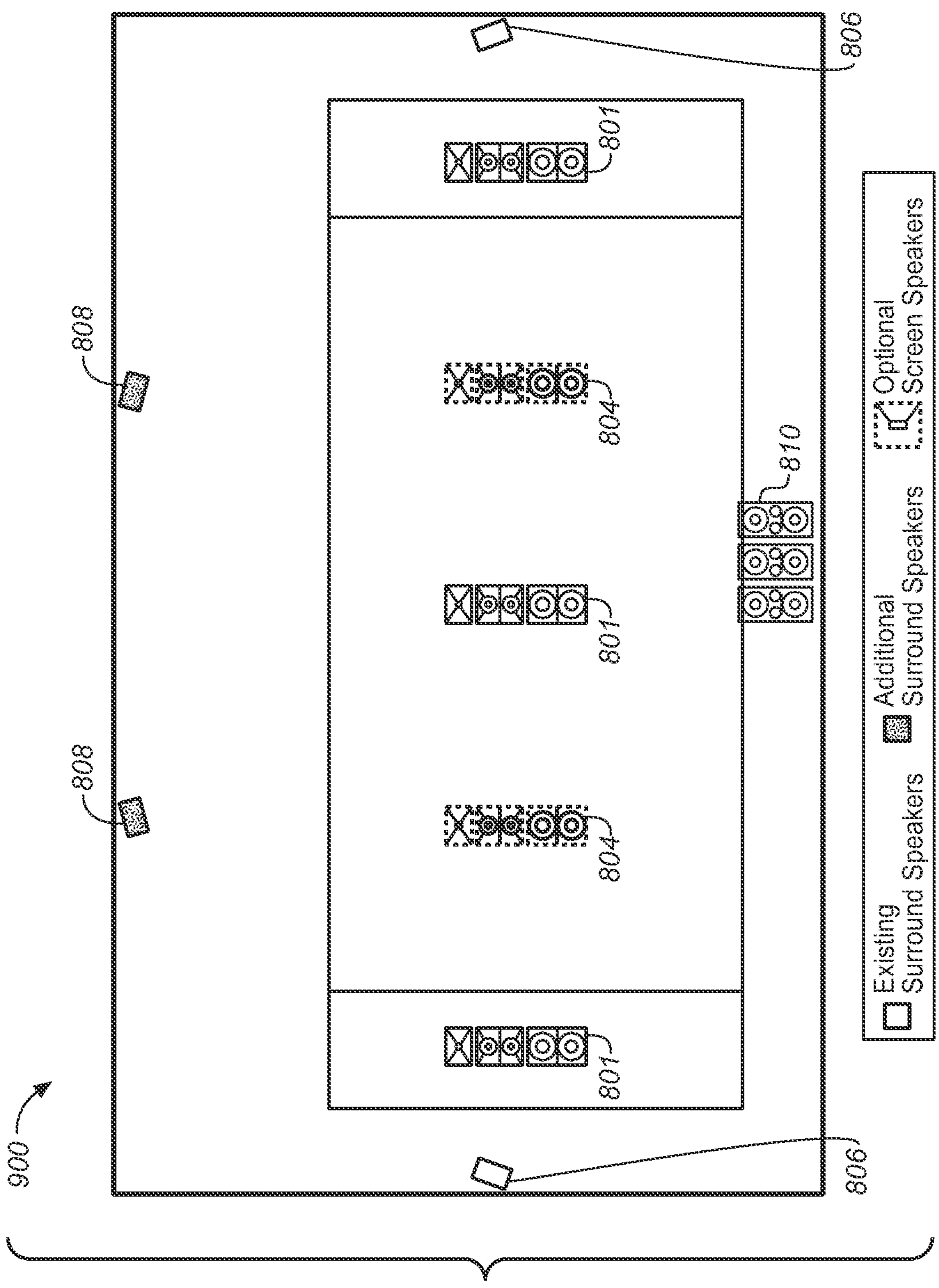
FIG. 9 is a front view of an example placement of suggested speaker locations at the screen for use in the typical auditorium.

FIG. 8 is an overhead view 800 of an example layout of suggested speaker locations for use with an adaptive audio system in a typical auditorium, and FIG. 9 is a front view 900 of the example layout of suggested speaker locations at the screen of the auditorium. The reference position referred to hereafter corresponds to a position ⅔ of the distance back from the screen to the rear wall, on the center line of the screen. Standard screen speakers 801 are shown in their usual positions relative to the screen. Studies of the perception of elevation in the screen plane have shown that additional speakers 804 behind the screen, such as Left Center (Lc) and Right Center (Rc) screen speakers (in the locations of Left Extra and Right Extra channels in 70 mm film formats), can be beneficial in creating smoother pans across the screen. Such optional speakers, particularly in auditoria with screens greater than 12 m (40 ft.) wide are thus recommended. All screen speakers should be angled such that they are aimed towards the reference position. The recommended placement of the subwoofer 810 behind the screen should remain unchanged, including maintaining asymmetric cabinet placement, with respect to the center of the room, to prevent stimulation of standing waves. Additional subwoofers 816 may be placed at the rear of the theatre.

Figure 11:
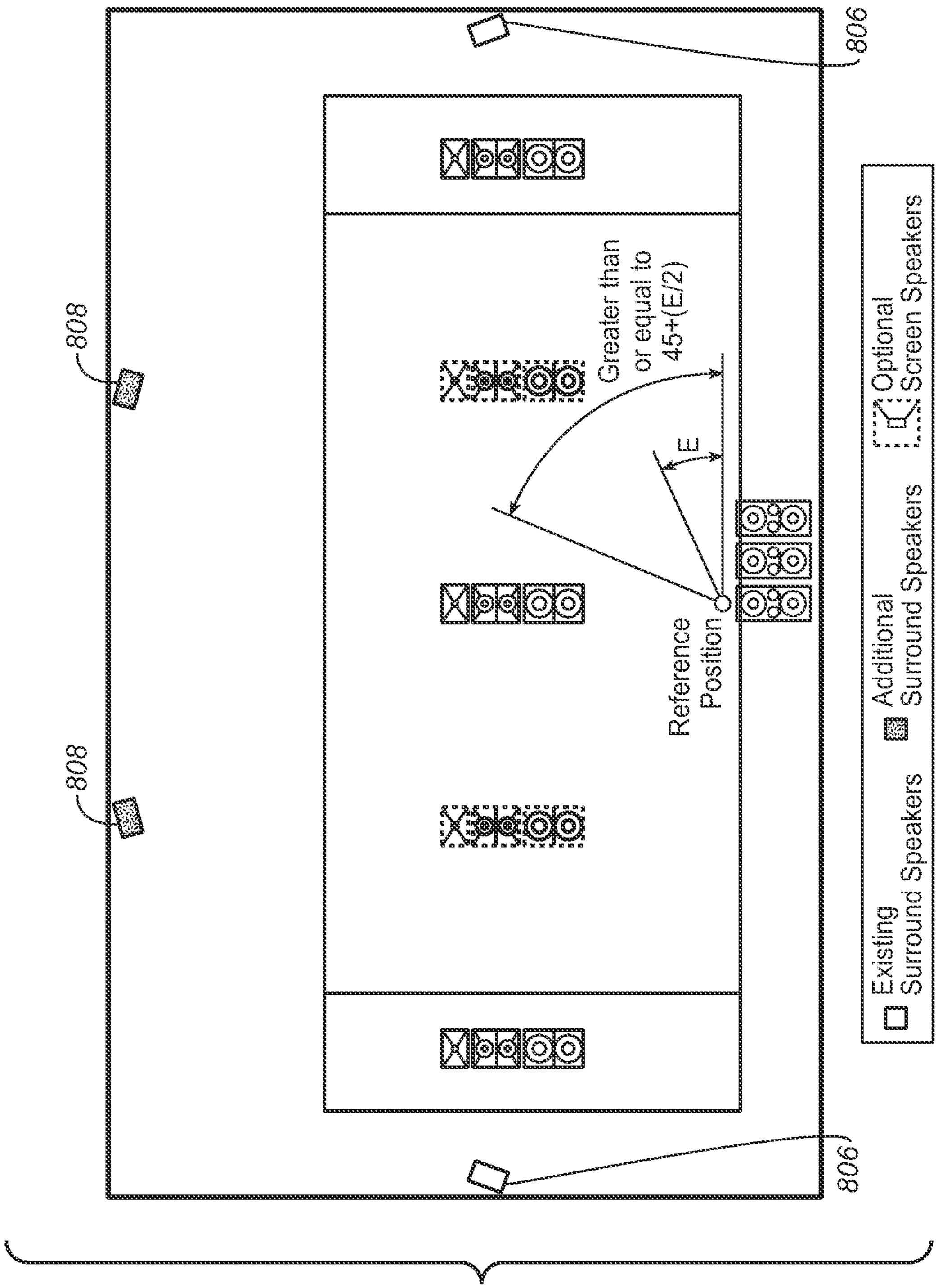
FIG. 11 is an example of a positioning of top surround speakers and side surround speakers relative to the reference point, under an embodiment.

Surround speakers 802 should be individually wired back to the amplifier rack, and be individually amplified where possible with a dedicated channel of power amplification matching the power handling of the speaker in accordance with the manufacturer's specifications. Ideally, surround speakers should be specified to handle an increased SPL for each individual speaker, and also with wider frequency response where possible. As a rule of thumb for an average-sized theatre, the spacing of surround speakers should be between 2 and 3 m (6'6" and 9'9"), with left and right surround speakers placed symmetrically. However, the spacing of surround speakers is most effectively considered as angles subtended from a given listener between adjacent speakers, as opposed to using absolute distances between speakers. For optimal playback throughout the auditorium, the angular distance between adjacent speakers should be 30 degrees or less, referenced from each of the four corners of the prime listening area. Good results can be achieved with spacing up to 50 degrees. For each surround zone, the speakers should maintain equal linear spacing adjacent to the seating area where possible. The linear spacing beyond the listening area, e.g., between the front row and the screen, can be slightly larger. FIG. 11 is an example of a positioning of top surround speakers 808 and side surround speakers 806 relative to the reference position, under an embodiment.

Figure 10:
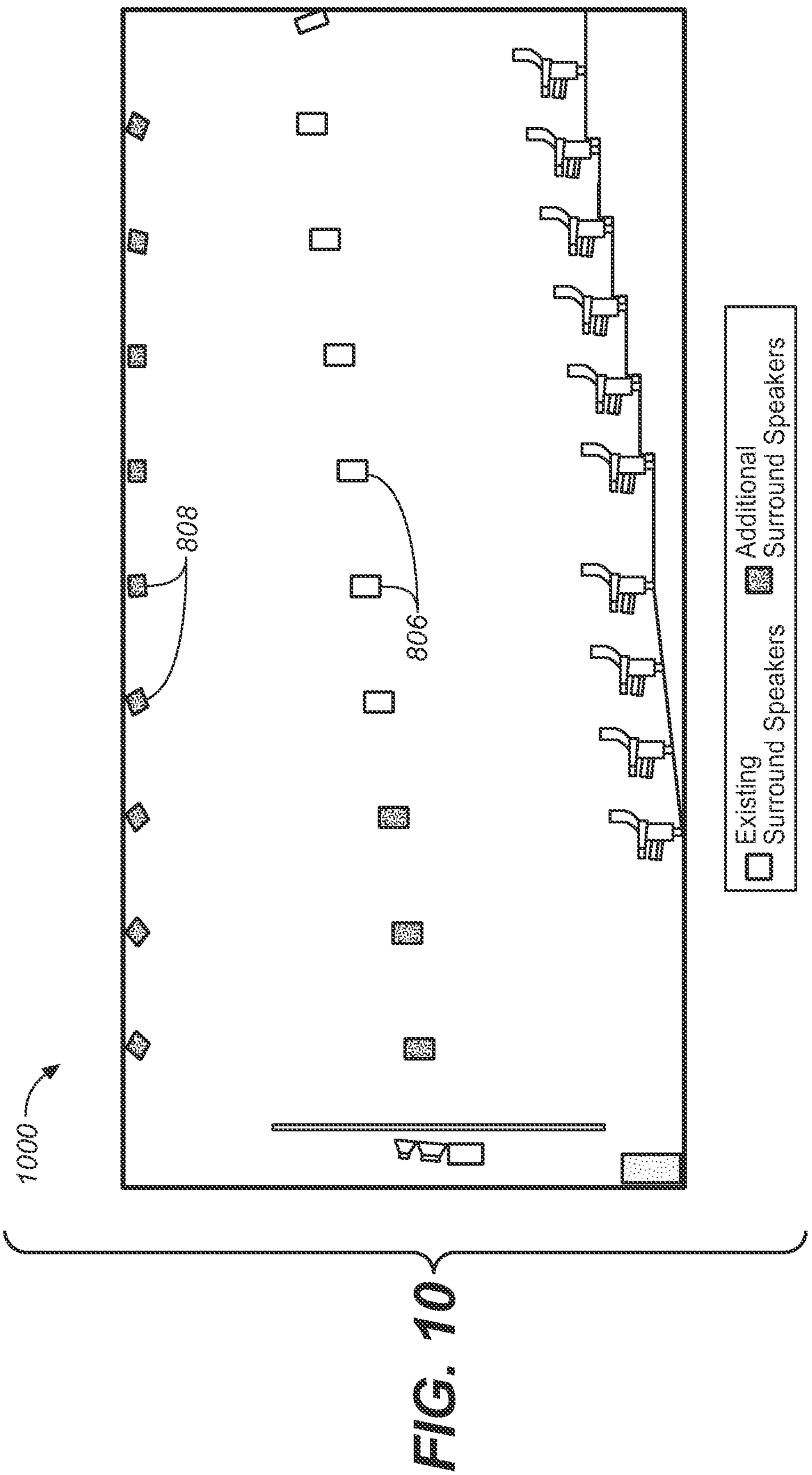
FIG. 10 is a side view of an example layout of suggested speaker locations for use with in adaptive audio system in the typical auditorium.

Additional side surround speakers 806 should be mounted closer to the screen than the currently recommended practice of starting approximately one-third of the distance to the back of the auditorium. These speakers are not used as side surrounds during playback of Dolby Surround 7.1 or 5.1 soundtracks, but will enable smooth transition and improved timbre matching when panning objects from the screen speakers to the surround zones. To maximize the impression of space, the surround arrays should be placed as low as practical, subject to the following constraints: the vertical placement of surround speakers at the front of the array should be reasonably close to the height of screen speaker acoustic center, and high enough to maintain good coverage across the seating area according to the directivity of the speaker. The vertical placement of the surround speakers should be such that they form a straight line from front to back, and (typically) slanted upward so the relative elevation of surround speakers above the listeners is maintained toward the back of the cinema as the seating elevation increases, as shown in FIG. 10, which is a side view of an example layout of suggested speaker locations for use with an adaptive audio system in the typical auditorium. In practice, this can be achieved most simply by choosing the elevation for the front-most and rear-most side surround speakers, and placing the remaining speakers in a line between these points.

In order to provide optimum coverage for each speaker over the seating area, the side surround 806 and rear speakers 816 and top surrounds 808 should be aimed towards the reference position in the theatre, under defined guidelines regarding spacing, position, angle, and so on.

Embodiments of the adaptive audio cinema system and format achieve improved levels of audience immersion and engagement over present systems by offering powerful new authoring tools to mixers, and a new cinema processor featuring a flexible rendering engine that optimizes the audio quality and surround effects of the soundtrack to each room's speaker layout and characteristics. In addition, the system maintains backwards compatibility and minimizes the impact on the current production and distribution workflows.

Although embodiments have been described with respect to examples and implementations in a cinema environment in which the adaptive audio content is associated with film content for use in digital cinema processing systems, it should be noted that embodiments may also be implemented in non-cinema environments. The adaptive audio content comprising object-based audio and channel-based audio may be used in conjunction with any related content (associated audio, video, graphic, etc.), or it may constitute standalone audio content. The playback environment may be any appropriate listening environment from headphones or near field monitors to small or large rooms, cars, open air arenas, concert halls, and so on.

Aspects of the system 100 may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof. In an embodiment in which the network comprises the Internet, one or more machines may be configured to access the Internet through web browser programs.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for processing audio signals, comprising a rendering system configured to:

receive a bitstream comprising encoded audio data representing a plurality of monophonic audio streams, and further comprising metadata associated with each of the monophonic audio streams and indicating a playback location of a respective monophonic audio stream, wherein at least some of the plurality of monophonic audio streams are identified as object-based audio, and wherein the playback location of an object-based monophonic audio stream comprises a location in a three-dimensional space, wherein at least some other of the plurality of monophonic audio streams are identified as channel-based audio, and wherein the playback location of a channel-based monophonic audio stream comprises a designation of a speaker in a speaker array;

decode the encoded audio data to provide the plurality of monophonic audio streams; and render the plurality of monophonic audio streams to a plurality of speaker feeds corresponding to speakers in a playback environment, wherein the speakers are placed at specific positions within the playback environment, and wherein one or more additional metadata elements associated with each respective object-based monophonic audio stream indicate whether rendering the respective monophonic audio stream into one or more specific speaker feeds of the plurality of speaker feeds is prohibited, such that the respective object-based monophonic audio stream is not rendered into any of the one or more specific speaker feeds of the plurality of speaker feeds.

2. The system of claim 1, wherein the metadata elements associated with each object-based monophonic audio stream further indicate spatial parameters controlling the playback of a corresponding sound component comprising one or more of: sound position, sound width, and sound velocity.

3. The system of claim 1, wherein the playback location for each of the plurality of object-based monophonic audio streams is independently specified with respect to either an egocentric frame of reference or an allocentric frame of reference, wherein the egocentric frame of reference is taken in relation to a listener in the playback environment, and wherein the allocentric frame of reference is taken with respect to a characteristic of the playback environment.

4. A method for authoring audio content for rendering, comprising:

receiving a plurality of audio signals;

generating a plurality of monophonic audio streams and metadata associated with each of the audio streams and indicating a playback location of a respective monophonic audio stream, wherein at least some of the plurality of monophonic audio streams are identified as object-based audio, and wherein the playback location of the object-based audio comprises a location in a three-dimensional space, wherein at least some other of the plurality of monophonic audio streams are identified as channel-based audio, and wherein the playback location of a channel-based monophonic audio stream comprises a designation of a speaker in a speaker array;

encoding the plurality of monophonic audio streams to provide encoded audio data; and encapsulating the encoded audio data and the metadata in a bitstream for transmission to a rendering system configured to render the plurality of monophonic audio streams to a plurality of speaker feeds corresponding to speakers in a playback environment, wherein the speakers are placed at specific positions within the playback environment, and wherein one or more additional metadata elements associated with each respective object-based monophonic audio stream indicate whether rendering the respective monophonic audio stream into one or more specific speaker feeds of the plurality of speaker feeds is prohibited, such that the respective object-based monophonic audio stream is not rendered into any of the one or more specific speaker feeds of the plurality of speaker feeds.

5. A non-transitory computer readable storage medium comprising a sequence of instructions, wherein, when executed by a system for processing audio signals, the sequence of instructions causes the system to perform the method of claim 4.

6. A method for rendering audio signals, comprising:

receiving a bitstream comprising encoded audio data representing a plurality of monophonic audio streams, and further comprising metadata associated with each of the audio streams and indicating a playback location of a respective monophonic audio stream, wherein at least some of the plurality of monophonic audio streams are identified as object-based audio, and wherein the playback location of an object-based monophonic audio stream comprises a location in three-dimensional space, wherein at least some other of the plurality of monophonic audio streams are identified as channel-based audio, and wherein the playback location of a channel-based monophonic audio stream comprises a designation of a speaker in a speaker array;

decoding the encoded audio data to provide the plurality of monophonic audio bitstreams; and rendering the plurality of monophonic audio streams to a plurality of speaker feeds corresponding to speakers in a playback environment, wherein the speakers are placed at specific positions within the playback environment, and wherein one or more additional metadata elements associated with each respective object-based monophonic audio stream indicate whether rendering the respective monophonic audio stream into one or more specific speaker feeds of the plurality of speaker feeds is prohibited, such that the respective object-based monophonic audio stream is not rendered into any of the one or more specific speaker feeds of the plurality of speaker feeds.

7. The method of claim 6, wherein the metadata elements associated with each object-based monophonic audio stream further indicate spatial parameters controlling the playback of a corresponding sound component comprising one or more of: sound position, sound width, and sound velocity.

8. The method of claim 6, wherein the playback location for each of the plurality of object-based monophonic audio streams comprises a spatial position relative to a screen within a playback environment, or a surface that encloses the playback environment, and wherein the surface comprises a front plane, a back plane, a left plane, right plane, an upper plane, and a lower plane, and/or is independently specified with respect to either an egocentric frame of reference or an allocentric frame of reference, wherein the egocentric frame of reference is taken in relation to a listener in the playback environment, and wherein the allocentric frame of reference is taken with respect to a characteristic of the playback environment.

9. A non-transitory computer readable storage medium comprising a sequence of instructions, wherein, when executed by a system for processing audio signals, the sequence of instructions causes the system to perform the method of claim 6.

* * * * *